(12) United States Patent
Reitz et al.

(10) Patent No.: US 7,980,765 B2
(45) Date of Patent: Jul. 19, 2011

(54) BEARING APPARATUS FEATURING ELECTRORHEOLOGICAL FLUID LUBRICATION

(75) Inventors: Ronald P. Reitz, Spring Hill, FL (US); Gus F. Plangetis, Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/813,643

(22) Filed: Jun. 11, 2010

(65) Prior Publication Data

US 2010/0247012 A1    Sep. 30, 2010

Related U.S. Application Data

(63) Continuation of application No. 11/890,105, filed on Jul. 24, 2007, now Pat. No. 7,736,063.

(51) Int. Cl.
*F16C 33/66* (2006.01)

(52) U.S. Cl. ......................... 384/322; 384/627

(58) Field of Classification Search ................... 384/322, 384/462

See application file for complete search history.

(56) References Cited

U.S. PATENT DOCUMENTS

| | | | | |
|---|---|---|---|---|
| 5,194,181 A * | 3/1993 | Reitz | ........................... | 252/500 |
| 5,296,155 A * | 3/1994 | Reitz | ........................... | 252/73 |
| 5,945,036 A * | 8/1999 | Reitz | ........................... | 252/572 |
| 6,180,574 B1 * | 1/2001 | Ryan et al. | ........................... | 508/106 |
| 6,193,014 B1 * | 2/2001 | Brackett | ........................... | 184/6.12 |
| 6,228,813 B1 * | 5/2001 | Yabe et al. | ........................... | 508/106 |
| 6,244,386 B1 * | 6/2001 | Takasaki et al. | ........................... | 184/11.2 |
| 6,280,090 B1 * | 8/2001 | Stephens et al. | ........................... | 384/284 |
| 6,290,397 B1 * | 9/2001 | Hashimoto | ........................... | 384/462 |
| 6,942,081 B2 * | 9/2005 | Wen et al. | ........................... | 192/21.5 |
| 7,018,102 B1 * | 3/2006 | Brotz | ........................... | 384/99 |

\* cited by examiner

*Primary Examiner* — Thomas R Hannon
(74) *Attorney, Agent, or Firm* — Howard Kaiser

(57) ABSTRACT

The present invention, as variously practiced, implements electrorheological fluid (ERF) as a bearing lubricant. Various modes of an inventive rolling element bearing apparatus provide for electrification of inventive electrode components, viz: (first mode) two annular disk electrodes, opposite each other and perpendicular to the two raceway surfaces; or, (second mode) electrically conductive inner and outer races, having an electrically conductive spacer therebetween; or, (third mode) plural electrodes, radially embedded in a race. An ERF lubricative coating remains on one or both raceway surfaces in accordance with Winslow effect principle (first and second modes) or edge effect principle (third mode). An inventive journal bearing apparatus provides for electrification of electrodes that are axially-longitudinally embedded in a journal bearing member, resulting in establishment of edge effect electric flux lines between adjacent electrode pairs, an ERF lubricative coating thereby remaining on the journal bearing member's inward facing surface, contiguous to the shaft.

20 Claims, 9 Drawing Sheets

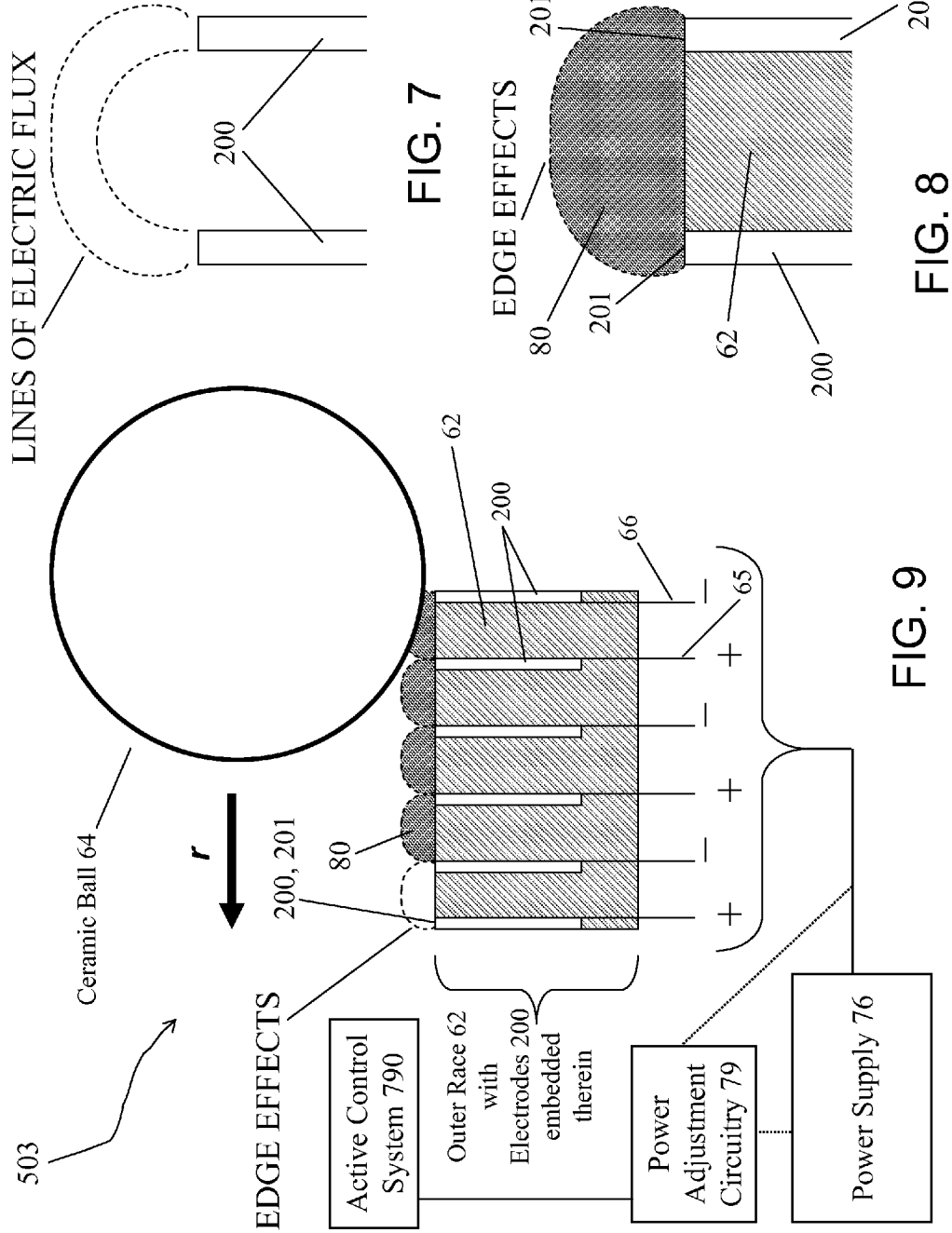

BEARING APPARATUS FEATURING ELECTRORHEOLOGICAL FLUID LUBRICATION

CROSS-REFERENCE TO RELATED APPLICATIONS

This application is a continuation of U.S. nonprovisional patent application Ser. No. 11/890,105, filing date 24 Jul. 2007, now U.S. Pat. No. 7,736,063, issue date 15 Jun. 2010, hereby incorporated herein by reference, entitled "Bearing Apparatus Having Electrorheological Fluid Lubricant," joint inventors Ronald P. Reitz and Gus F. Plangetis.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to bearings, more particularly to methodologies (such as involving lubrication) for reducing adverse effects (such as wear) associated with frictional contact characterizing bearing operation.

Bearings are used in a wide variety of machinery, including motors and other rotating machines. Bearings are frequently the first component of equipment to fail. Failure of rolling element bearings (e.g., ball bearings or roller bearings), for instance, is commonly associated with tribological effects (e.g., "wear and tear") when insufficient lubrication is applied to the surfaces of the rolling elements (e.g., balls or rollers). Incorporated herein by reference are the following book excerpts, which are instructive concerning bearings and lubrication: Chapter 8.4 (pages 8-114 to 8-138; entitled "Fluid-Film Bearings"; by Dudley D. Fuller) of *Marks' Standard Handbook for Mechanical Engineers*, Ninth Edition, Eugene A. Avallone and Theodore Baumeister III, Editors, McGraw-Hill Book Company, New York, 1986, ISBN 0-07-004127-X; Chapter 8 (pages 352-392; entitled "Lubrication") of Merhyle F. Spotts, *Design of Machine Elements*, Fifth Edition, Prentice-Hall, Inc., Englewood Cliffs, New Jersey, 1978, ISBN 0-13-200576-X.

A longstanding objective in the bearing-related arts has been to improve the lubrication of bearings so as to minimize wear and extend the useful life of the bearings. Various methodologies have been proposed to achieve improved lubrication in bearings, such as disclosed by the following U.S. patents, each of which is incorporated herein by reference: Yabe et al. U.S. Pat. No. 6,228,813 B1 issued 8 May 2001; Brackett U.S. Pat. No. 6,193,014 B1 issued 27 Feb. 2001; Ryan et al. U.S. Pat. No. 6,180,574 B1 issued 30 Jan. 2001; Stephens et al. U.S. Pat. No. 6,280,090 B1 issued 28 Aug. 2001; Takasaki et al. U.S. Pat. No. 6,244,386 B1 issued 12 Jun. 2001; Hashimoto U.S. Pat. No. 6,290,397 B1 issued 18 Sep. 2001; and, Stephens et al. U.S. Pat. No. 6,280,090 B1 issued 28 Aug. 2001.

Yabe et al. disclose use of a polymer film to coat the race surfaces of a rolling element bearing. The bearing is filled with a polymer that contains lubricant; the lubricant is released as the rolling element exerts pressure on the film coating during operation. A disadvantage of this methodology is that, over time, the film releases all of its lubricant; the film itself becomes "lubricant starved." Another disadvantage is that the properties of the film degrade over time due to polymer aging effects. The compression of the rolling element accelerates the aging effects, which consequently degrade the capabilities of the film to function as a lubricant-releasing agent.

Brackett discloses atomizing of pressurized air with a lubricant so as to provide a spray mist. A disadvantage of this methodology is that, once the mist has been deposited onto the race, it is then free to flow from and/or drip off the race; that is, the lubricant is not "secured" to the surface of the race, but can leave the race due to the action of gravity. Furthermore, generally speaking, the viscosity of a lubricant is temperature-dependent, the viscosity decreasing with increasing temperature. The viscosity of the lubricant determines its flow and drip characteristics; that is, when the viscosity of the lubricant decreases, the lubricant flows faster. Thus, when operating temperature conditions change, so too will the flow and drip characteristics of the lubricant. Therefore, according to the methodology of Brackett, under some operating conditions the lubricant will flow or drip from the race surface faster than under other operating conditions; at higher temperatures, the viscosity of the lubricant will be lower and the flow rate of the lubricant (e.g., away from the race) will be higher. Under operating conditions of lower viscosity and higher flow, if too much lubricant flows away then insufficient residual lubricant remains on the race, the bearing thus remaining "lubricant-starved."

Ryan et al. disclose application of a solid lubricant coating to a bearing. A disadvantage is that the solid lubricant of Ryan et al. functions as a result of wearing away; that is, small particles of solid lubricant are shaved off of the coating by the rolling element as the rolling element moves along race surface. The coating is eventually worn away because the number of particles shaved off increases over time. Moreover, as Ryan et al.'s coating is worn away, the increasing clearance between the rolling elements and the races leads to problems relating to vibration.

The bearings disclosed by Takasaki et al. and Hashimoto involve the flinging or flowing of lubricating fluid onto a bearing surface by means of a component that picks up the lubricating fluid as the shaft and inner race turn. The bearing lubrication approaches of Takasaki et al. and Hashimoto are disadvantageous similarly as is that of Brackett. The lubricant is free to flow or drip from the race surface(s) once it is flung or flowed onto the race surface(s). Further, the flow rate away from the race surface is dependent upon the viscosity of the lubricant and is therefore temperature-dependent.

Stephens et al. disclose "microstructures" (e.g, "microchannels" or "microposts") to help distribute lubricant in a bearing. A disadvantage of Stephens' microstructures is that, since the surfaces they form are uneven (unsmooth), the distribution of compression forces acting on a bearing element, and hence the wear of the bearing element, is uneven. The surface areas formed by the "peaks" (highest elevations) of the microstructures are subjected to higher compression forces, and hence are prone to greater wear, than are the less elevated surface areas.

SUMMARY OF THE INVENTION

In view of the foregoing, it is an object of the present invention to provide an improved methodology for lubricating bearings.

An electrorheological fluid (abbreviated herein "ER fluid" or "ERF") is a composition comprising a dielectric fluid and a multiplicity of electrically polarizable particles dispersed in the dielectric fluid. The following U.S. patents, each of which is incorporated herein by reference, are informative regarding electrorheological fluids: Reitz U.S. Pat. No. 5,194,181 issued 16 Mar. 1993; Reitz U.S. Pat. No. 5,296,155 issued 22 Mar. 1994; and, Reitz U.S. Pat. No. 5,945,036 issued 31 Aug. 1999. When an ERF is electrically energized to a sufficient degree, the viscosity of the ERF increases and the ERF is capable of sustaining a shear stress. Such are the characteristics of an ERF that, when electrically energized, it can be suspended between two electrodes. The ERF remains in position between the two electrodes until either the electric field is removed or the ERF is displaced (e.g., the ERF mechanically pushed out of the way by a suitable means).

The present invention employs an electrorheological fluid as the lubricant for a bearing. Featured by the present invention is the holding in position, via electrification of electrodes or electrode-analogues, of electrorheological fluid on a bearing surface, so that the electrorheological fluid lubricates the bearing surface and the frictionally contacting component or components. As frequently embodied, the present invention features the holding in position, via electrification of electrodes or electrode-analogues, of electrorheological fluid on a raceway surface of a rolling element bearing, so that the electrorheological fluid lubricates the raceway surface and the rolling elements as the rolling elements move over the raceway surface.

Depending on the inventive embodiment, other inventive features include: reducing the viscosity of the electrorheological fluid (as by ceasing electrification thereof) to facilitate removal and replacement of the electrorheological fluid; controllably changing the magnitude of electrification of the electrorheological fluid (e.g., in terms of voltage or current) so as to controllably change the viscosity of the electrorheological fluid; controllably changing the magnitude of electrification of the electrorheological fluid (e.g., in terms of voltage or current) in one or more selected regions of the bearing so as to controllably vary the viscosity of the electrorheological fluid from region to region. The present invention affords easy lubricant replacement in bearing applications requiring high viscosity lubricant during operation. The present invention maintains higher viscosity of the ERF lubrication during operation by energizing the ERF lubricant, and reduces the viscosity of the ERF lubrication (thereby facilitating drainage/emptying of the ERF lubricant) by refraining from energizing the ERF lubricant. The viscosity of the ERF lubricant can be controllably altered during operation in order to promote better performance. The viscosity of one or more specific regions of the ERF lubricant can be controllably varied while the viscosity of the ERF lubricant in one or more other regions is held constant; in this manner, the present invention succeeds in controlling the pressure distribution over various arc-lengths of a circular bearing such as a rolling element bearing or journal bearing.

According to frequent inventive practice, the ERF lubricant is energized during operation so that a high viscosity is maintained. When the electrorheological fluid lubricant needs to be replaced (e.g., is excessively old or used), a portal in the bearing housing is opened after the electric field is shut off. Turning off the electric field enables the old/used lubricant to freely flow out of the portal and also enables new, fresh electrorheological fluid lubricant to be introduced into the bearing housing. The "de-energizing" of the electrorheological fluid lubricant reduces the viscosity, thereby enabling free flow of the old/used lubricant out of the bearing through the portal. The new, fresh electrorheological fluid lubricant is non-electrified and therefore flows easily into the bearing. Moreover, in accordance with the present invention, the viscosity of the ERF lubricant can be controllably changed in response to changes in temperature of the bearing. During operation of the inventive bearing apparatus, the speed of rotation may vary; hence, the temperature due to frictional heating may vary. Generally, with regard to inventive adjustment of the ERF lubricant, a consideration shared by the various modes of inventive practice is that the viscosity of the ERF lubricant should be sufficiently high that ERF lubricant remains in the desired location or locations, but should not be excessively high whereby ERF lubricant hinders the relative rotational motion of the relatively rotating components (e.g., the outer race and the inner race in first-mode, second-mode, and third-mode inventive practice; or, the journal bearing member and the shaft in fourth-mode inventive practice).

The present invention can be practiced as various kinds of bearing apparatus, including rolling element bearings and journal bearings. The term "rolling element bearing" is used herein to broadly refer to any bearing involving a principle of rolling friction. Ball bearings (wherein the rolling elements are, e.g., spherical) and roller bearings (wherein the rolling elements are, e.g., cylindrical) are rolling element bearings. The term "race surface" as used herein generally means a surface (of a race) at least a portion of which is subjected to rolling contact by rolling elements. A race surface typically describes a circular "track" of the rolling elements. A race surface can be even (e.g., smooth or flat to conform with cylindrical rolling elements) or uneven (e.g., including a channel/groove/furrow that conforms with spherical rolling elements). The term "journal bearing" is used herein to broadly refer to any bearing involving a principle of sliding friction. The present invention provides multifarious embodiments, which can be categorized in terms of at least four inventive "modes." Electrorheological fluid (ERF) is implemented as a bearing lubricant in accordance with the various modes of inventive practice. An inventive rolling element bearing mode provides for electrification of two opposite annular disk electrodes; a Winslow effect electric field is established therebetween so that an ERF lubricative coating remains on one or both raceway surfaces. Another inventive rolling element bearing mode provides for electrification of electrically conductive inner and outer races; Winslow effect electric fields are established between the inner race and the electrically conductive spacer, and between the outer race and the electrically conductive spacer) electric fields, so that an ERF lubricative coating remains on both raceway surfaces. Another inventive rolling element bearing embodiment provides for electrification of electrodes that are radially embedded in a race; edge effect electric flux lines are established between adjacent electrode pairs so that an ERF lubricative coating remains between the adjacent electrode pairs on the embedded race's raceway surface. An inventive journal bearing mode provides for electrification of electrodes that are axially-longitudinally embedded in a journal bearing member; edge effect electric flux lines are established between adjacent electrode pairs so that an ERF lubricative coating remains on the journal bearing member's inside surface, between the journal bearing member's inside surface and the shaft's outside surface.

According to typical embodiments of a first mode of inventive practice, a rolling element bearing apparatus comprises an inner race, an electrically nonconductive outer race, plural electrically nonconductive rolling elements, a housing, electrorheological fluid, and a pair of annular disk-shaped electrodes. The inner race has an outward facing raceway surface. The outer race has an inward facing raceway surface. The rolling elements are situated between the inner race and the outer race. The rolling elements effect rolling contact with the outward facing raceway surface and the inward facing raceway surface. The rolling elements revolve in an approximately vertical circumferential path around the approximately horizontal longitudinal axis of a rotating shaft when the outer race is stationary and the inner race is secured to the rotating shaft. The housing defines a fluid-tight chamber accommodative of the circumferential path. The electrorheological fluid partially fills the chamber so as to form an electrorheological fluid bath in a lower region of the chamber. A lower section of the inward facing raceway surface is immersed in the electrorheological fluid bath. An upper section of the inward facing raceway surface is not immersed in the electrorheological fluid bath. Each revolving rolling element passes through the electrorheological fluid bath and carries a quantity of electrorheological fluid onto the upper section of the inward facing raceway surface. The electrodes are situated parallel and opposite to each other, each electrode extending perpendicularly from the inward facing raceway surface and being separated from the outward facing raceway surface. Upon electrification of the electrodes an electric field is established between the electrodes so as to retain some electrorheological fluid between the electrodes. A lubricative electrorheological fluid coating thereby remains on at least a portion of the inward facing raceway surface; according to typical inventive practice, the at least a portion of the inward facing raceway surface includes the upper section of the inward facing raceway surface.

According to typical embodiments of a second mode of inventive practice, a rolling element bearing apparatus comprises an electrically conductive inner race, an electrically conductive outer race, plural electrically nonconductive rolling elements, a housing, electrorheological fluid, an electrically conductive spacer, and a power supply. The inner race has an outward facing raceway surface. The outer race has an inward facing raceway surface. The rolling elements are situated between the inner race and the outer race. The rolling elements effect rolling contact with the outward facing raceway surface and the inward facing raceway surface, and revolve in a circumferential path around the longitudinal axis of a rotating shaft when either the inner race is rotating relative to the outer race or the outer race is rotating relative to the inner race. The term "relative rotational motion" is used herein, in the context of rolling element bearing apparatus, to refer to rotation of either race with respect to the other race, such as: when the inner race is stationary and the outer race is rotating; or, alternatively, when outer race is stationary and the inner race is rotating; or, alternatively, when both the inner race and the outer race are rotating, at different speeds; or, alternatively, when both the inner race and the outer race are rotating, in different directions; or, alternatively, when both the inner race and the outer race are rotating, at different speeds and in different directions. The housing defines a fluid-tight chamber accommodative of the circumferential path. The electrorheological fluid partially fills the chamber. Each revolving rolling element contacts some electrorheological fluid and carries a quantity of electrorheological fluid. The spacer, for spacing apart the rolling elements at fixed distances, has an inward facing spacer surface and an outward facing spacer surface. The spacer is interposed between the inner race and the outer race, the inner race and outer race being separated from the spacer and from each other. An inner electrorheological fluid containment region is delimited by the outward facing raceway surface and the inward facing spacer surface. An outer electrorheological fluid containment region is delimited by the inward facing raceway surface and the outward facing spacer surface. The power supply is for electrifying the inner race and the outer race so that an inner electric field is established by the inner race and the spacer in the inner electrorheological fluid containment region, and so that an outer electric field is established by the outer race and the spacer in the outer electrorheological fluid containment region. Some electrorheological fluid is thereby contained in the inner electrorheological fluid containment region via the inner electric field, and some electrorheological fluid is thereby contained in the outer electrorheological fluid containment region via the outer electric field. According to frequent inventive practice, the geometric rotational axis is the geometric longitudinal axis of a horizontal (or approximately horizontal) rotating shaft, the circumferential path in which the rolling elements revolve lies in a vertical (or approximately vertical) geometric plane, the outer race is stationary, the inner race is secured to the rotating shaft, and the electrorheological fluid partial fills the chamber so as to form an electrorheological fluid bath in a lower region of the chamber.

According to typical embodiments of a third mode of inventive practice, a rolling element bearing apparatus comprises an inner race, an electrically nonconductive outer race, plural electrically nonconductive rolling elements, a housing, electrorheological fluid, and plural electrodes. The inner race has an outward facing raceway surface. The outer race has an inward facing raceway surface. The rolling elements are situated between the inner race and the outer race. The rolling elements effect rolling contact with the inward facing raceway surface and the outward facing raceway surface, and revolve in a circumferential path around the longitudinal axis of a rotating shaft when either of the inner race and the outer race is rotating relative to the other of the inner race and the outer race (i.e., when the inner race is stationary and the outer race is rotating, or when the outer race is stationary and the inner race is rotating, or when both the inner race and the outer race are rotating, but at different speeds and/or in different directions). The housing defines a fluid-tight chamber accommodative of the circumferential path. The electrorheological fluid partially fills the chamber. Each revolving rolling element contacts some electrorheological fluid and carries a quantity of electrorheological fluid. The electrodes are embedded in the outer race and are spaced apart (e.g., spaced closely apart so that adjacent electrodes are nearly parallel) so as to be positioned radial or approximately radial with respect to the longitudinal axis. In other words, each embedded electrode defines a geometric line segment that coincides with a geometric line that is perpendicular or approximately perpendicular to the longitudinal axis. As the present invention is typically practiced, the embedded electrodes define respect geometric line segments that lie or approximately lie in the same geometric plane that is perpendicular to the longitudinal axis. Each electrode has an electrode tip and extends to the inward facing raceway surface so that the tip is flush with the inward facing raceway surface and is exposed to the chamber. Upon electrification of at least one adjacent pair of electrodes, an electric flux is established between the adjacent pair of electrodes so as to retain some said electrorheological fluid on the inward facing raceway surface and between the adjacent pair of electrodes. According to frequent inventive practice, the geometric rotational axis is the geometric longitudinal axis of a horizontal (or approximately horizontal) rotating shaft, the circumferential path in which the rolling elements revolve lies in a vertical (or approximately vertical) geometric plane, the outer race is stationary, the inner race is secured to the rotating shaft, and the electrorheological fluid partial fills the chamber so as to form an electrorheological fluid bath in a lower region of the chamber.

According to typical embodiments of a fourth mode of inventive practice, a journal bearing apparatus is for use in association with a shaft characterized by a longitudinal shaft axis. The inventive journal bearing apparatus comprises a cylindrical electrically nonconductive bearing member, electrorheological fluid, and plural electrodes. The bearing member is for circumscriptive placement with respect to the shaft. The bearing member is characterized by a bearing length, and has an inward facing bearing surface characterized by a first circumference. The shaft has an outward facing shaft surface characterized by a second circumference that is smaller than the first circumference. When the bearing member is circumscriptively placed with respect to the shaft, a space exists between the inward facing bearing surface and the outward facing shaft surface. The electrorheological fluid is for disposition between the inward facing bearing surface and the outward facing shaft surface. The electrodes are embedded in the bearing member, and are separated from each other so as to be positioned parallel to the longitudinal shaft axis and to each other. Each electrode has an electrode edge and extends at least substantially along the bearing length so that the electrode edge is flush with the inward facing bearing surface and is exposed to the space. Upon electrification of at least one adjacent pair of electrodes, an electric flux is established between the adjacent pair of electrodes so as to retain some electrorheological fluid on the inward facing bearing surface and between the adjacent pair of said electrodes. According to frequent practice of the present invention's journal bearing apparatus, upon electrification of at least one adjacent pair of electrodes, a lubricative electrorheological fluid coating remains on the inward facing bearing surface between the adjacent pair of electrodes.

The inventive journal bearing apparatus can be embodied so that the electrodes are positioned around at least substantially the entire first circumference; upon electrification of every adjacent pair of electrodes, an electric flux is established between every adjacent pair of electrodes so as to retain some electrorheological fluid around at least substantially the entire first circumference of the inward facing bearing surface. According to frequent inventive practice, a lubricative electrorheological fluid coating thereby remains on at least substantially the entire first circumference of the inward facing bearing surface. The inventive journal bearing apparatus, as often embodied, further comprises a power supply (for electrifying at least one said adjacent pair of said electrodes) and power adjustment circuitry (for adjusting the degree of electrification of each of at least one adjacent pair of electrodes so as to adjust the viscosity and hence the lubricative quality of some electrorheological fluid retained between the adjacent pair of electrodes). Some inventive journal bearing embodiments are selectively adjustable according to region or electrode pair; that is, the power adjustment circuitry is capable of individually adjusting the degree of electrification for each of plural adjacent pairs of said electrodes. During normal operation of the inventive journal bearing apparatus, the inward facing bearing surface is concentric with the outward facing shaft surface; however, the inventive journal bearing apparatus may tend over time to become non-concentric with the outward facing shaft surface. The present invention's power adjustment circuitry as often embodied has the capability of selectively adjusting the viscosity of the electrorheological fluid at different locations in the space between the inward facing bearing surface and the outward facing shaft surface, thereby restoring concentricity of the inward facing bearing surface with the outward facing shaft surface. An active control system can be inventively implemented in association with power adjustment circuitry to take sensory input as to one or more parameters (e.g., ambient heat, machinery heat, rotational speed) and, based on the sensory input, to actively adjust in a continuous feedback manner the amount of electrical power (and hence the viscosity of the corresponding ERF lubricant) that goes to every location or to one or more specific locations. The power adjustment can be performed globally (e.g. as to both or all electrodes or electrode pairs), in groups (e.g., as to groups of electrode pairs), and/or individually (e.g., as to individual electrode pairs).

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein like numbers indicate same or similar parts, components, or elements, and wherein:

As shown in FIG. 2, two ball bearings are used in association with a shaft that connects a steam turbine with an electric generator.

FIG. 7 is a diagram illustrating the lines of electric flux that are established upon electrification of two adjacent electrodes that are implemented by an embodiment of the present invention's ball bearing apparatus in accordance with the "third mode" of inventive practice.

FIG. 8 is a diagram, corresponding to FIG. 7, illustrating the associated electrorheological "edge effects" whereby some ER fluid is situated, between the tips of the two electrodes, upon the inward facing surface of the outer race.

FIG. 9 is a diagram of an embodiment of the present invention's ball bearing apparatus in accordance with the "third mode" of inventive practice, in particular illustrating relative movement of a ball along the inward facing surface of the outer race, wherein the outer race has closely spaced, approximately parallel, approximately radial electrodes embedded therein, and wherein the inward facing surface of the outer race is provided with an ER fluid coating by means of electrorheological edge effects.

FIG. 13 represents various states of lubrication for journal bearings that use fluid lubricants.

DETAILED DESCRIPTION OF THE INVENTION

Figure 1:
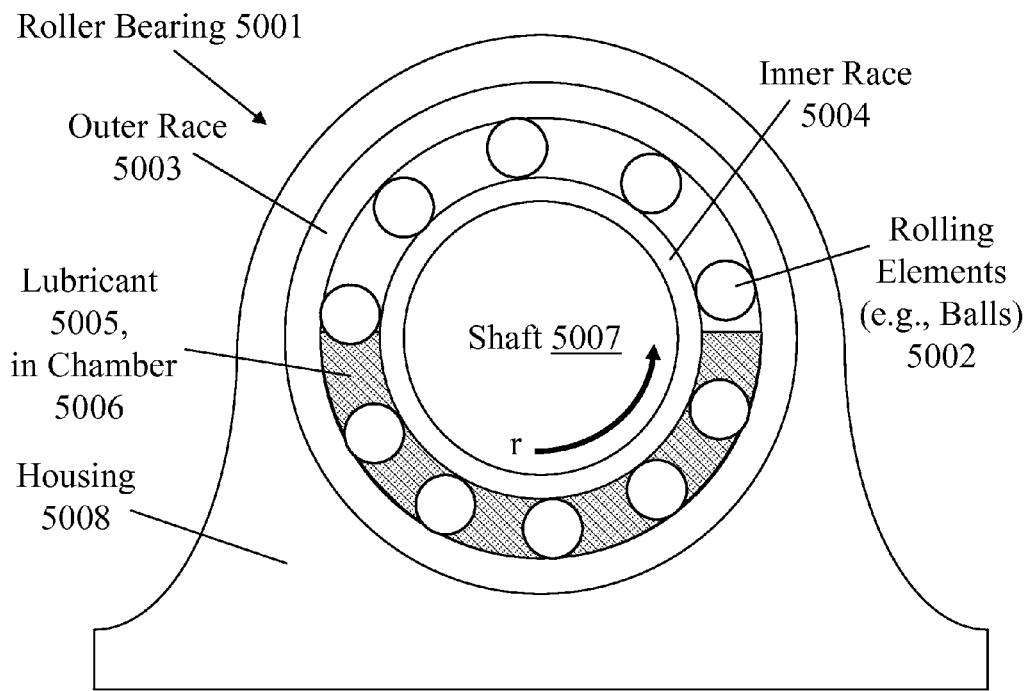
FIG. 1 is an elevation view of a conventional ball bearing having a "pillow block" configuration. Not shown for illustrative purposes in FIG. 1, but understood to be typically included in a pillow block configuration, is a retainer that spaces the balls apart from each other at fixed distances.
Figure 2:
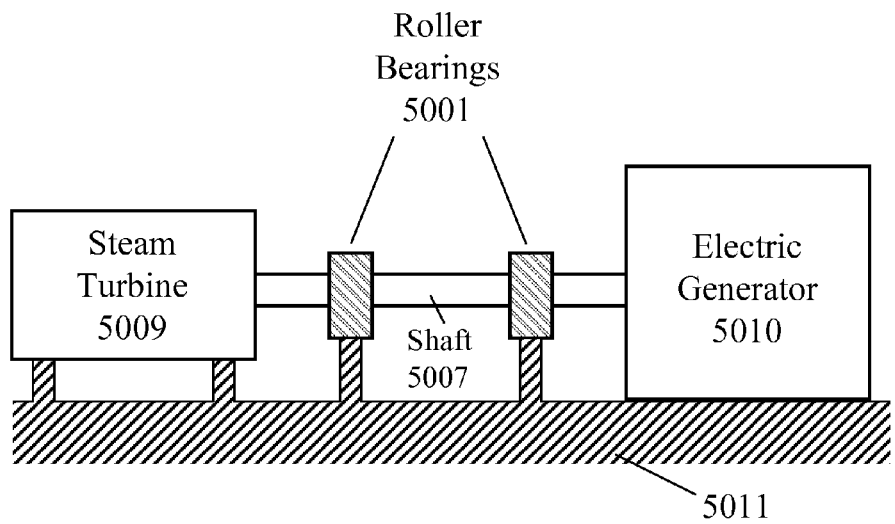
FIG. 2 is an elevation view of but one of many examples of ball bearing use.

Reference is now made to FIG. 1 and FIG. 2, which illustrate typical configuration and use of a conventional "pillow block" ball bearing 5001. As shown in FIG. 1, the balls (rolling elements) 5002 roll between an inner race 5004 and an outer race 5003, which are the "tracks" on which the balls roll. The inner race and the outer race are concentric with each other. The outer race is attached to the exterior housing 5008 of the bearing. The inner race is attached to a shaft 5007, which is turned for a useful purpose. For instance, as depicted in FIG. 2, rotation of the shaft, associated with a steam turbine 5009, results in the generation of electricity by an electric generator 5010; that is, the generator produces electricity when the shaft is turned. The bearing's exterior housing is attached to a stationary foundation 5011 on which the electric generator rests.

A typical feature of a conventional ball bearing is a fluid-tight chamber (interior space) 5006 for containment of a conventional lubricating fluid 5005. Typically, the chamber is not filled entirely with lubricant, but rather with a percentage of the volume of the chamber. The chamber is filled partially, rather than totally, to prevent "churning" of the lubricant, which can significantly degrade the lubricative characteristics. The lower portion of the outer race borders upon the lubricant "bath" that is formed due to gravitational influence on the lubricant. A normal but disadvantageous result of such partial filling, according to conventional practice, is insufficient lubrication of the upper portion of the outer race.

By way of explanation, when the shaft and the inner race are turned, the outward facing surface of the inner race and all of the balls in time move into and through the lubricant bath (i.e., the lubricant-filled lower region of the bearing's chamber), and emerge into the non-filled upper region of the bearing's chamber. The balls and the inner race thus become lubricated as the shaft turns. The outer race, however, does not turn. Lubrication between the balls and the inward facing surface of the upper portion of the outer race occurs when each ball emerges from the lubricant bath. Frequently, the lubrication on the surface of the ball rubs off as the ball begins moving along this upper portion of the outer race; when this happens, the balls become "lubricant-starved." The friction in the lubricant-starved portion of the outer race causes wear and eventual wear-induced failure of the bearing.

Described hereinbelow are Examples 1 through 4, which correspond respectively to first-mode inventive practice through fourth-mode inventive practice. Examples 1 through 3 are representative of roller bearing-type embodiments of the present invention. Inventive first mode, inventive second mode, and inventive third mode can each be practiced, for instance, when the rolling element is a sphere or a cylinder. Example 4 is representative of journal bearing-type embodiments of the present invention. The ordinarily skilled artisan who reads the instant disclosure will understand that some characteristics are shared by two or more among the four modes of inventive practice, and that certain configurational, operational and/or material features of a given inventive example are or may be similar to those characterizing one or more other inventive examples, regardless of explicit statement or restatement to such effect.

In each of Examples 1, 2 and 3, the chamber 75 is filled with an appropriate amount of ERF lubricant 80, typically representing a percentage of the capacity of chamber 75 that promotes optimal operation of the inventive apparatus. As compared with inventive second-mode practice, inventive first-mode practice and inventive third-mode practice may each tend to involve utilization of less ERF lubricant. For instance, according to some first-mode inventive embodiments and some third-mode inventive embodiments, chamber 75 is filled with ERF lubricant 80 to no more than about twenty-five percent of the capacity of chamber 75. Also by way of example, according to some second-mode inventive embodiments, chamber 75 is filled with ERF lubricant 80 in the range between about forty percent and about fifty percent of the capacity of chamber 75. Depending on what is most suitable for a given inventive embodiment, inventive practice can provide for filling of the lubricant chamber with ERF lubricant to any capacity less than complete capacity of the lubricant chamber—i.e., in the range greater than zero percent and less than one hundred percent of the capacity of the lubricant chamber.

EXAMPLE 1

A first mode of the present invention is typically practiced so as to describe a kind of ball bearing pillow block arrangement similar to that shown in FIG. 1. According to the first inventive mode, the ERF lubricant is held in position, by means of an electric field, onto either or both of the inner and outer races. The inventive rolling element bearing apparatus is configured with two electrodes suitable for electrically holding the ER fluid in position on a raceway surface. As a rolling element moves over the raceway surface, it pushes most of the ERF lubricant out of its path, except for a thin lubricant layer that remains between the rolling element and the raceway surface. The inventive rolling element bearing is lubricated primarily by virtue of the lubricant layer coating the raceway surface.

Figure 3:
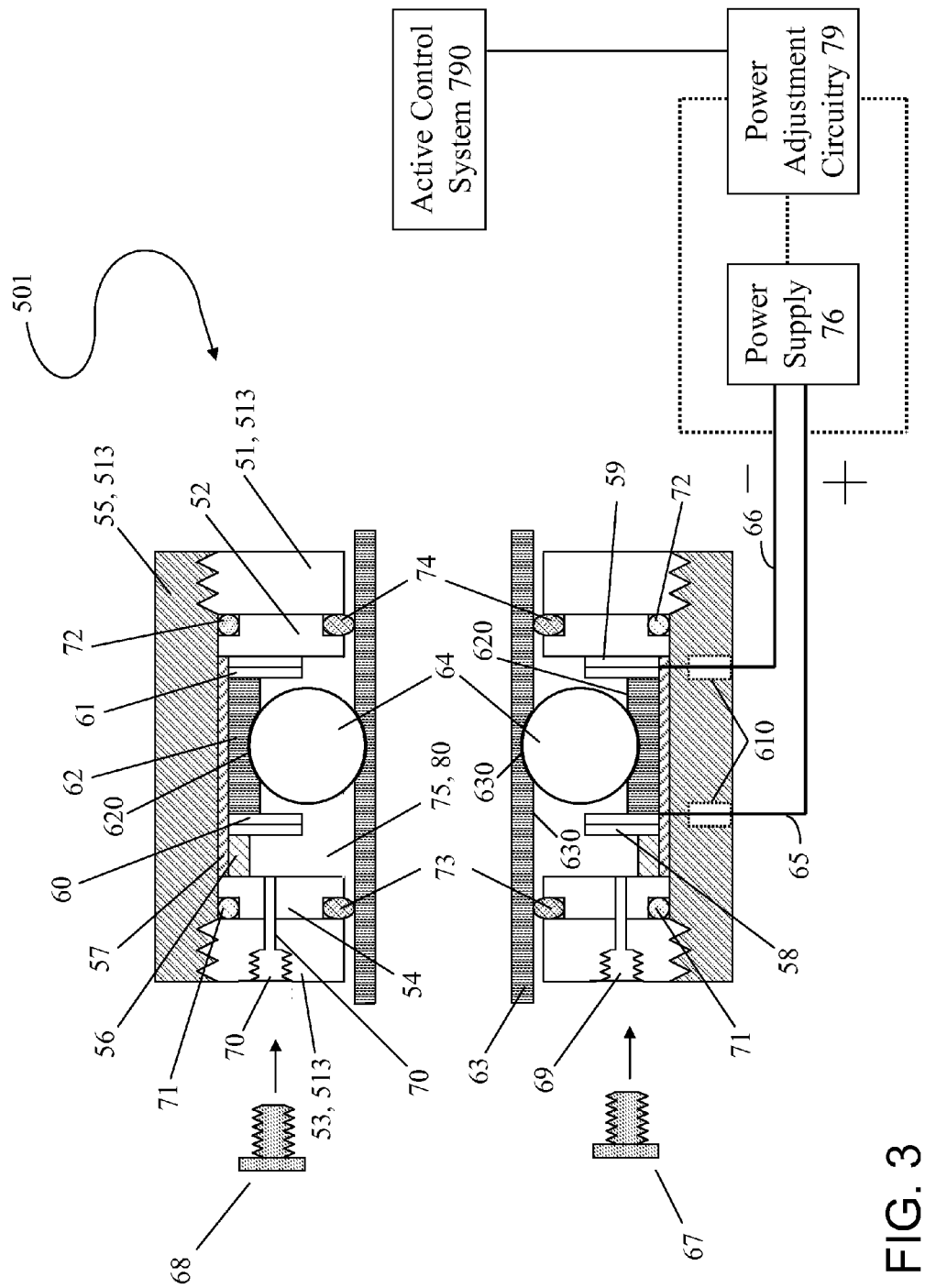
FIG. 3 is a diagrammatic and diametrically cross-sectional view of an embodiment of the present invention's ball bearing apparatus in accordance with the "first mode" of inventive practice.
Figure 4:
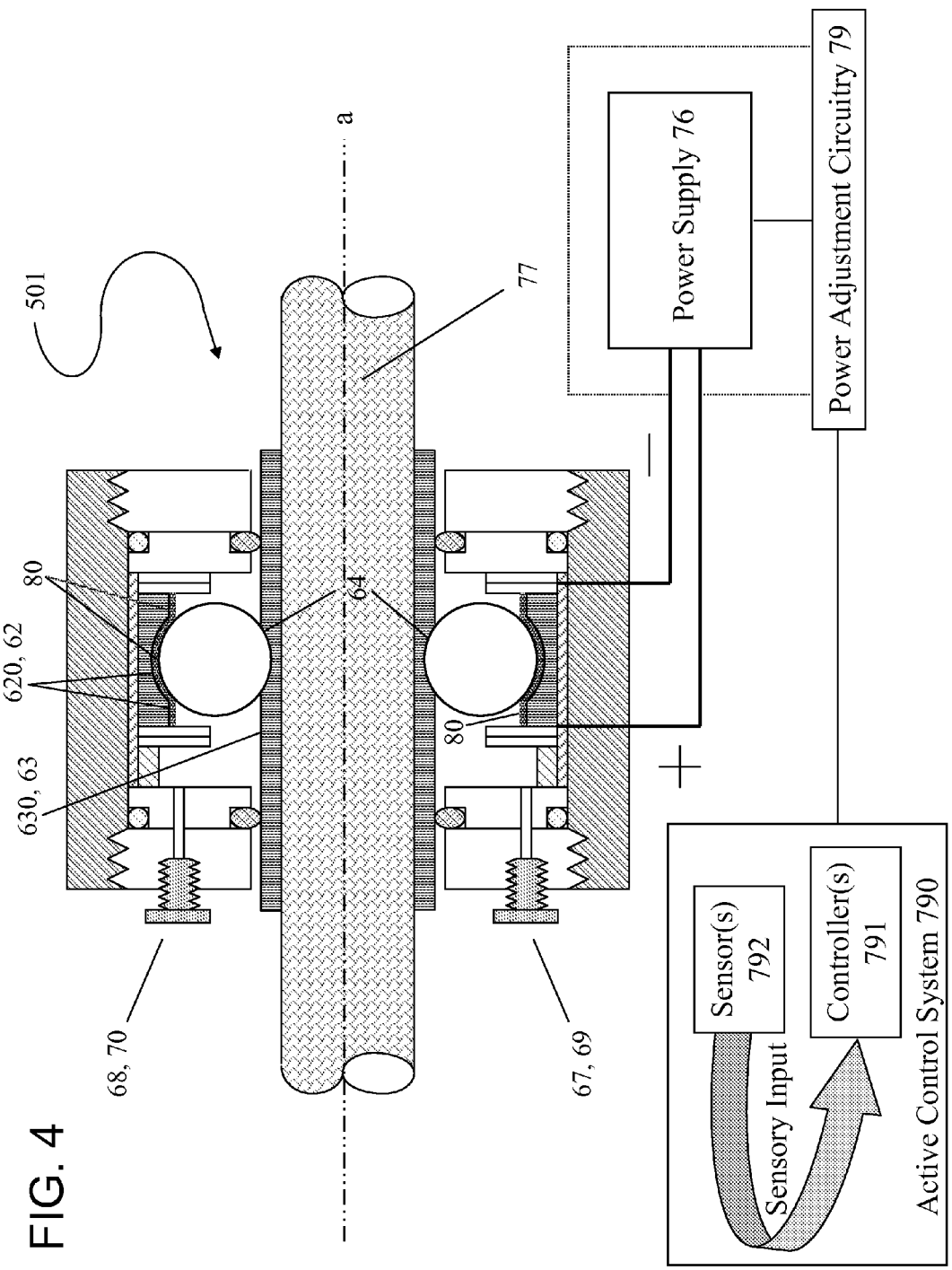
FIG. 4 is the inventive ball bearing apparatus shown in FIG. 3, in similar view, wherein the screws are shown to be engaged with the channels, wherein a shaft is shown to be joined to the inner race, and wherein an ERF lubricant coating is shown to be inventively provided on the inward facing raceway surface of the outer race.

The inventive embodiment described herein with reference to FIG. 3 and FIG. 4 involves a horizontal rotating shaft, a circular bearing element path defining a vertical geometric plane, attachment of an inner race to the horizontal rotating shaft, and extension of inventive electrodes from a stationary, electrically nonconductive outer race; nevertheless, the ordinarily skilled artisan who reads this disclosure will understand how first-mode inventive practice can involve: any of various kinds of relative rotational motion between the inner race and the outer race; any of various vertical and non-vertical orientations of the bearing element path; extension of inventive electrodes from either or both of the inner race and the outer race. Inventive practice typically demands that whichever race that the inventive electrodes extend from be electrically nonconductive. Hence, the inner race is electrically nonconductive if inventive electrodes extend from the inner race; the outer race is electrically nonconductive if inventive electrodes extend from the outer race; both the inner race and the outer race are electrically nonconductive if inventive electrodes extend from each of the inner race and the outer race.

Referring now to FIG. 3 and FIG. 4, inventive ball bearing apparatus 501 includes housing ends 51 and 53, "O"-ring support disks 52 and 54, housing 513, spacer cylinder 56, electrically nonconductive cylinder 57, electrically nonconductive materials 58 and 59, electrodes 60 and 61, outer race 62, inner race 63, balls 64, electrode wires 65 and 66, screws 67 and 68, channels 69 and 70, "O"-rings 71, 72, 73 and 74, ERF lubricant chamber 75, and ERF lubricant 80. Outer race 62 and inner race 63 are concentric with each other. Inner race 63 has a grooved outward facing raceway surface 630. Outer race 62 is electrically nonconductive (e.g., made of ceramic) and has a grooved inward facing raceway surface 620.

Figure 5:
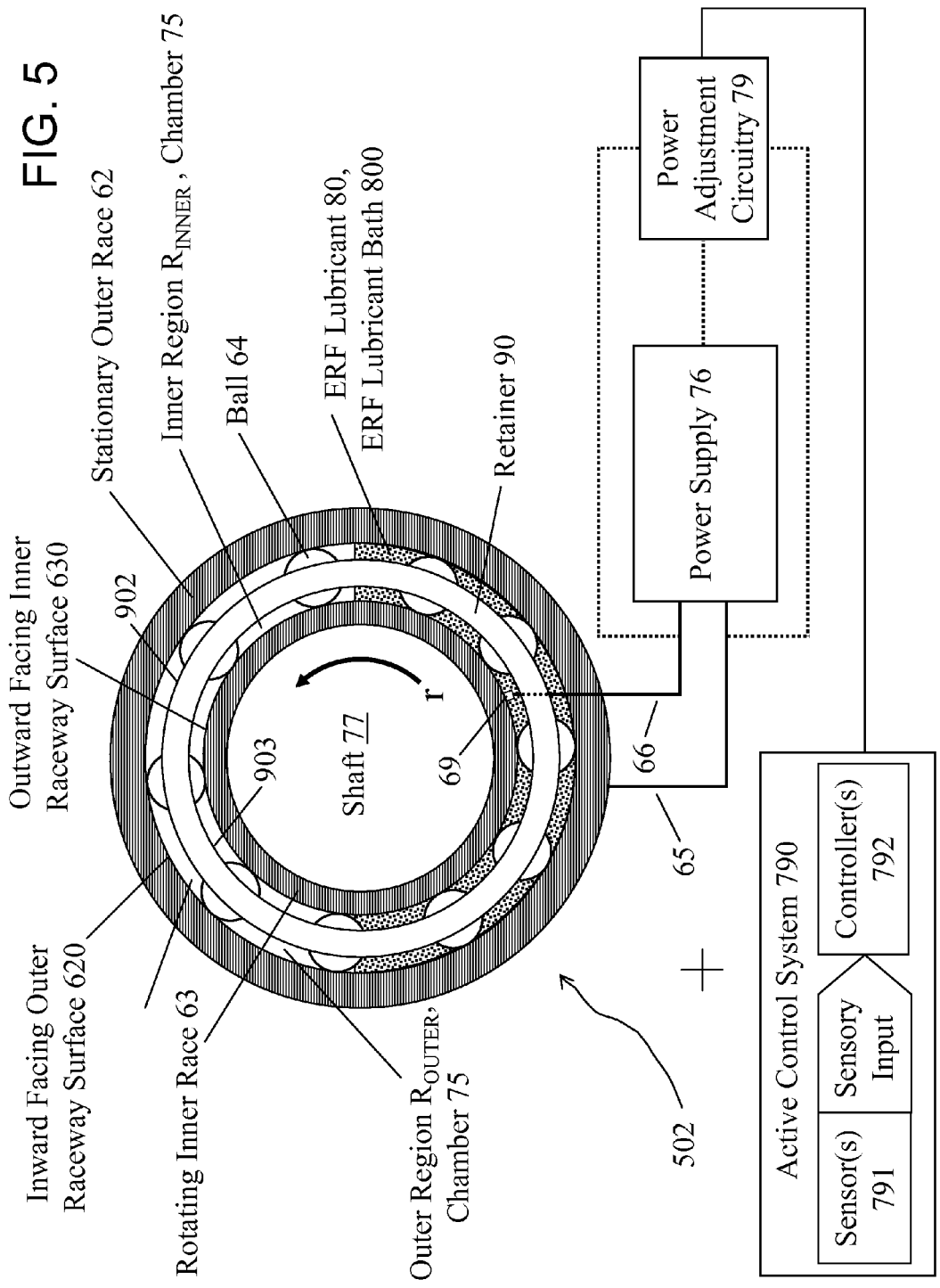
FIG. 5 is a diagrammatic and elevation view of an embodiment of the present invention's ball bearing apparatus in accordance with the "second mode" of inventive practice.
Figure 6:
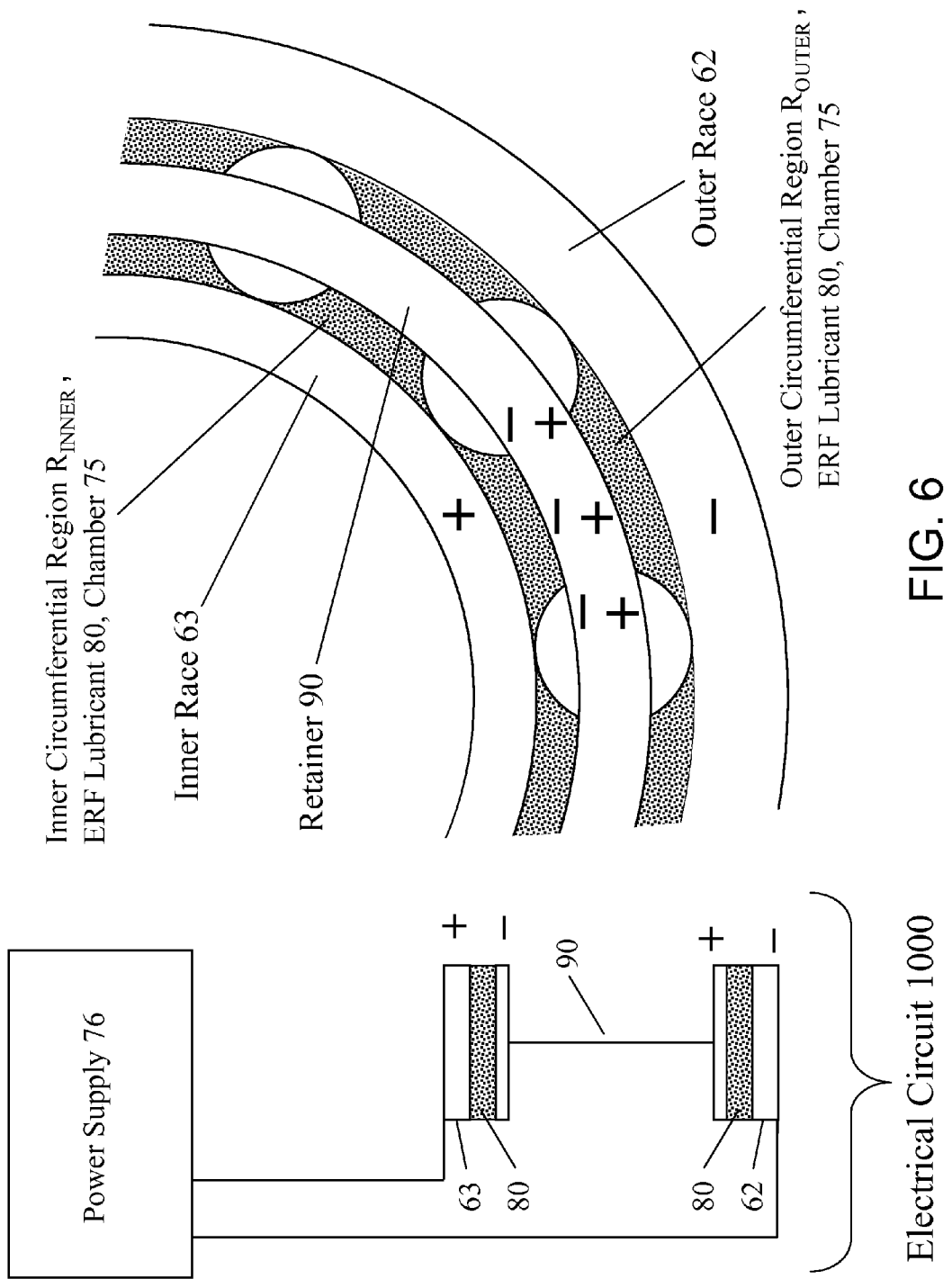
FIG. 6 is diagram illustrating, in juxtaposition, the inventive ball bearing apparatus shown in FIG. 5 (shown in partial and enlarged view in FIG. 6) and the electrical circuit represented thereby.

Plural balls 64 are electrically nonconductive (e.g., made of ceramic) and are situated between the inner race 63 and the outer race 62. Electrodes 60 and 61, made of an electrically conductive material (e.g., a metal such as copper, or a metal alloy), are annular disks (disks with a hole in the center), similar in form to washers. The two annular disk-shaped electrodes 60 and 61 are situated parallel and opposite to each other. Each of electrodes 60 and 61 extends perpendicularly from the inward facing raceway surface 620 of outer race 62, and is separated from the outward facing raceway surface 630 of inner race 63. A retainer (spacer) 90 such as shown in FIG. 5 and FIG. 6 is not shown in FIG. 3 and FIG. 4 so that other features are more clearly illustrated; nevertheless, according to typical practice of inventive first mode embodiments, a retainer (spacer) that spaces balls 64 apart from each other at fixed distances is included in the inventive ball bearing apparatus 501.

Inventive ball bearing 501 can be used to support a rotatable shaft such as shaft 77 shown in FIG. 4. The outer race 62 is stationary, and the inner race 63 is secured to shaft 77. While shaft 77 is turning (rotating), the balls 64 effect rolling contact with outward facing raceway surface 630 and inward facing raceway surface 620, and revolve in an approximately vertical circumferential path around the approximately horizontal geometric longitudinal axis a of shaft 77. Housing 513 includes circumferential housing portion 55 and housing end portions 51 and 53. Housing 513 defines a fluid-tight chamber 75 that is accommodative of the circumferential path of balls 64. Inventive ball bearing 501 is connected to power supply 76 by electrode wires 65 and 66. Wire 65 connects power supply 76 to electrode 60; wire 66 connects power supply 76 to electrode 61. A seal system 610, such as diagrammatically shown in FIG. 3, is provided for each of the wires 65 and 66 and its corresponding electrode 60 or 61 in order to seal the wire portion passing through and its corresponding electrode within the circumferential housing portion 55 of the housing 513. Each seal system 610 includes, for instance, packing material or an O-ring, and serves to prevent leakage of ERF lubricant 80 at that location.

The circumferential housing portion 55 and housing end portions 51 and 53 are made of any suitable metal or metal alloy material such as stainless steel, bronze, copper, zinc, etc. Housing end portions 51 and 53 can be joined with circumferential housing portion 55 using threading in housing end portions 51 and 53 that corresponds to threading in circumferential housing portion 55. Housing end portion 53 has two channels, 69 and 70, which can be made (e.g., by drilling with commercially available precision drill, and then tapping) after housing end 53 and "O"-ring support disk 54 are seated into circumferential housing portion 55 in the position shown in FIG. 3. It may be preferable at this point to disassemble to remove all metal shavings resulting from the drilling and tapping, and to then reassemble. Screws 67 and 68 and "O"-ring support disks 52 and 54 are made of any suitable metal or metal alloy material, such as stainless steel, bronze, copper, zinc, etc. "O"-ring support disks 52 and 54 have edges that are machined out to accommodate "O"-rings 71, 72, 73 and 74, as shown in FIG. 3.

Inventive ball bearing apparatus 501 also includes electrorheological fluid lubricant 80. FIG. 5, which pertains to typical second-mode inventive practice, shows ERF lubricant 80 in the form of an ERF lubricant bath 800. ERF lubricant 80 is shown in FIG. 5 to gravitationally form an ERF lubricant bath 800. ERF lubricant bath 800 shown in FIG. 5 is representative of an ERF lubricant 80 bath that is involved in typical first-mode inventive practice. Channels 69 and 70 serve as conduits that permit the lubricant chamber 75 to be at least partially filled with electrorheological fluid lubricant 80. According to typical first mode inventive embodiments, chamber 75 is filled with ERF lubricant to a suitable percentage of the capacity of chamber 75, thereby gravitationally forming an ERF lubricant bath 800 in the lower half of chamber 75, similarly as illustrated in FIG. 5. Channels 69 and 70 also permit the ERF lubricant 80 to be changed when the ERF lubricant 80 has reached the end of its useful operational life. As depicted in FIG. 4, channels 69 and 70 are sealed to prevent leakage of the ERF lubricant 80 after its introduction, through channels 69 and 70, into chamber 75. Channels 69 and 70 are bored and tapped with an interior thread pattern that corresponds to the outer thread pattern on screws 67 and 68, respectively.

Electrically nonconductive cylinder 57 is made of any suitable electrically nonconductive material, such as a ceramic, plastic, or resin matrix composite material. Cylinder 57 is dimensioned so that, when it is placed in the configuration shown in FIG. 3, cylinder 57 encompasses spacer cylinder 56, electrically nonconductive materials 58 and 59, electrodes 60 and 61, outer ceramic race 62, inner race 63, and balls 64. In particular, electrically nonconductive cylinder 57 is circumscriptive with respect to electrodes 60 and 61 and is situated between electrodes 60 and 61 and housing exterior 55, thereby electrically isolating electrodes 60 and 61 from housing exterior 55 (and hence from the overall housing 513). In addition, cylinder 57 serves to space "O"-ring support disks 52 and 54 from each other.

"O"-rings 71, 72, 73 and 74 are made of any suitable elastomeric polymer that does not adversely react, either chemically or physically, with the ERF lubricant 80. "O"-rings 71, 72, 73 and 74 should not include an elastomeric polymer with respect to which any of the constituents of the ERF lubricant 80 are miscible or permeable. For instance, if the dielectric fluid of the ERF lubricant includes silicone oil, then the "O"-rings 71, 72, 73 and 74 should not include a silicone rubber; the reason is that the silicone oil of the ERF lubricant will cause the "O"-rings 71, 72, 73 and 74 to swell and leak, thereby enabling the ERF lubricant 80 to leak out of inventive bearing apparatus 501. If the dielectric fluid of the ERF lubricant 80 includes a silicone oil, then "O"-rings 71, 72, 73 and 74 may include nitrile, neoprene or polyurethane. As another example, if the ERF lubricant 80 includes a dielectric fluid of mineral oil, olive oil, corn oil, or vegetable oil, then "O"-rings 71, 72, 73 and 74 may include silicone rubber, because such dielectric fluids are neither miscible nor permeable with respect to silicone rubber.

Inner race 63 may be made of any suitable metal, metal alloy or nonmetallic material. Balls 64 are made of any suitable electrically nonconductive material, such as a suitable ceramic material. Outer race 62 is also made of any suitable electrically nonconductive material, such as a suitable ceramic material. According to typical inventive practice, the balls 64 and the outer race 62 both have a ceramic material composition. The materials of which the balls 64 and the outer race 62 are respectively composed should be sufficient and suitable in terms of hardness and compatibility. For instance, according to some inventive embodiments, the hardness of the ceramic material of which the outer race 62 is composed is about 85 or higher on the shore "D" scale. The public literature is replete with teachings about appropriate material compositions of rolling elements used in bearings. The criteria for selecting the outer race 62 material include the suitability for rolling of balls 64 on an outer race 62 made of such material.

Prior to operation of inventive apparatus 501, chamber 75 is filled to a suitable capacity with ERF lubricant 80 (i.e., the materials that make up ERF lubricant 80). The amount of ERF lubricant 80 in chamber 75 is such as to constitute enough ER lubricant to afford complete coating of the inward facing raceway surface 620 of outer race 62 during operation. Power supply 76 is connected to electrodes 60 and 61 for electrifying electrodes 60 and 61. According to some inventive embodiments, power adjustment circuitry 79 is connected to power supply 76 for adjusting the degree of electrification of electrodes 60 and 61. Power supply 76 is turned on to provide sufficient voltage and current for holding the ERF lubricant 80 on the inward facing raceway surface 620 of outer race 62. Electrorheological fluid lubricant 80 partially fills chamber 75 so as to form an electrorheological fluid bath 800 in the lower region of chamber 75. The lower section of the inward facing raceway surface 620 (but not the upper section of the inward facing raceway surface 620) is immersed in the electrorheological fluid lubricant bath 800.

During operation of inventive apparatus 501, balls 64 move into and out of the ER fluid lubricant 80 bath 800, which is situated, by force of gravity, in the bottom half of the chamber 75. As balls 64 revolve around the central axis a of shaft 77, shown in FIG. 4, balls 64 each carry some ER lubricant 80 to the upper areas of outer race 62's inward facing raceway surface 620. Each revolving ball 64 passes through the electrorheological fluid lubricant bath 800 and carries a quantity of electrorheological fluid lubricant 80 onto the upper section of inward facing raceway surface 620. Upon electrification of electrodes 60 and 61, an electric field is established between electrodes 60 and 61 so as to retain therebetween some ERF lubricant 80. That is, the electric field from the charges on electrodes 60 and 61 strips the balls 64 of this carried ERF lubricant 80, and holds the ERF lubricant 80 in position between the electrodes 60 and 61. More and more ERF lubricant 80 is carried by balls 64 to the upper areas of the inward facing raceway surface 620 of outer race 62 so that, eventually, the entire inward facing raceway surface 620 of outer race 62 is coated with ERF lubricant 80. Power adjustment circuitry 79 (which can include, for instance, one or more or a combination of one or more resistors, potentiometers, diodes, voltage regulators and/or transformers) can be modulated so as to adjust the amount of electrical power that is brought to bear on electrodes 60 and 61, thereby adjusting the viscosity, and hence the lubricative quality, of the ERF lubricant 80 that is retained between electrodes 60 and 61. Shown in FIG. 4 is an active control system 790, including at least one controller 791 (such as one or more commercially available programmable logic controllers) and at least one sensor 792. Active control system 790 can be inventively implemented to enhance inventive operation via feedback depending on heat generated by machinery/equipment, ambient/environmental (e.g., engine room) heat, and/or rotational speed (e.g., in rpm) of the shaft 77. A similar active control system 790 can be inventively implemented, as well, in second-mode inventive practice, in third-mode inventive practice, and in fourth-mode inventive practice, as shown respectively in FIG. 5, in FIG. 9, and in FIG. 14. Depending on the inventive embodiment, an active control system 790 exercises local and/or global control of electrification based on sensory input pertaining to one or more of these or other parameters.

EXAMPLE 2

Referring now to FIG. 5 and FIG. 6, inventive ball bearing apparatus 502 includes electrically conductive outer race 62, electrically conductive inner race 63, electrically nonconductive balls 64, electrorheological fluid lubricant 80, electrically conductive retainer (spacer) 90, electrical power supply 76, electrode wires 65 and 66, and electrical connector 69. Balls 64 are spaced apart from each other by retainer 90. Balls 64 are electrically nonconductive (e.g., made of ceramic). Electrical wire 65 and electrical wire 66 (via electrical connector 69) connect power supply 76 to outer race 62 and inner race 63, respectively. As shown in FIG. 5, electrical connector 69 (e.g., a leaf spring or brush) is attached at the end of electrical wire 66 and makes electrical contact with the rotating inner race 63. Inventive ball bearing apparatus 502 also includes a fluid-tight housing, such as housing 513 shown in FIG. 3 and FIG. 4, which defines a fluid-tight chamber 75, which encloses ERF lubricant 80, balls 64, and retainer 90 and which accommodates the circular revolution of balls 64. Prior to operation of inventive apparatus 502, chamber 75 is filled to a suitable percentage of its capacity with ERF lubricant 80, for instance so as to form a bath such as ERF lubricant bath 800 shown in FIG. 5.

Retainer 90, inner race 63 and outer race 62 are electrically conductive (e.g., made of a metal or metal alloy material that is electrically conductive). Outer race 62 and inner race 62 are made of any electrically conductive material (e.g., metal or metal alloy) that is suitable for functioning as a bearing race, such as a properly hardened (e.g., steel) alloy or a surface-hardened treated (e.g., steel) alloy. Balls 64 are made of any electrically nonconductive material, such as a ceramic material, that is suitable for ball bearing applications. Retainer 90 is made of any suitable electrically conductive material (e.g., metal or metal alloy), such as copper. Electrode wires 65 and 66 include any suitable electrical wire conductor material, such as aluminum, copper, or zinc. Power supply 76 includes any suitable DC or AC electrical power supply. DC power supply series LX model PS/LX030P066-11, sold by Glassman High Voltage, Inc., of Whitehouse Station, New Jersey, is but one example of numerous manufacturers and models of commercially available DC power supplies that may be suitable for inventive practice.

The terms "spacer" and "retainer" are used interchangeably herein. Retainer 90 may be custom made, or may be obtained as an off-the-shelf item from a commercial vendor. The geometry of retainer 90 is such that it permits the balls 64 to move in circular motion between races 62 and 63, but spaces the balls 64 apart from each other, thereby minimizing wear. Retainer 90 is interposed between and proximate (but not touching) races 62 and 63 so as not to be in electrical contact with races 62 and 63. Nor are races 62 and 63 in electrical contact with each other. As illustrated in FIG. 6, an electrical circuit 1000 is constituted by the combination including power supply 76, outer race 62, inner race 63, retainer 90, and ERF fluid 80.

Electrode wires 65 and 66 are electrically connected to power supply 76 and to races 62 and 63, respectively. Power supply 76 is turned on to energize outer race 62 and inner race 63. Energizing having commenced, ERF lubricant 80 gets trapped within the corresponding electric fields that build up in two regions of the bearing, viz., in inner region $R_{INNER}$ and outer region $R_{OUTER}$. Outward facing raceway surface 630 and inward facing retainer surface 903 are opposite each other. Inward facing raceway surface 620 and outward facing retainer surface 902 are opposite each other Inner region $R_{INNER}$ is the space between inner race 63's outward facing raceway surface 630 and retainer 90's inward facing retainer surface 903. Outer region $R_{OUTER}$ is the space between outer race 62's inward facing raceway surface 620 and retainer 90's outward facing retainer surface 902. Inventive ball bearing apparatus 502 can be embodied to include power adjustment circuitry 79 (including, e.g., one or more or a combination of one or more resistors, potentiometers, diodes, voltage regulators and/or transformers), which can be modulated so as to adjust the amount of electrical power that is brought to bear on outer race 62 and inner race 63, thereby adjusting the viscosity, and hence the lubricative quality, of the ERF lubricant 80 that is retained between outer race 63 and retainer 90 and between inner race 62 and retainer 90. The active control system 790 shown in FIG. 5 is similar in function to the active control system 790 shown in each of FIG. 4, FIG. 9 and FIG. 14. Active control system 790, which includes at least one controller 791 (e.g., programmable logic controller) and at least one sensor 792 (e.g., thermometer, accelerometer), can be inventively implemented in association with power adjustment circuitry 79 to sense one or more parameters (e.g., ambient heat, machinery heat, rotational speed) and, based on such sensory input, to actively adjust the amount of electrical power (and hence the viscosity of ERF lubricant 80) on a continuous feedback basis.

The viscosity of the ERF lubricant 80 should be adjusted to being just high enough to permit the ERF lubricant 80 to remain within the two regions $R_{INNER}$ and $R_{OUTER}$; however, the viscosity of the ERF lubricant 80 should not be so high as to interfere with the rotation of shaft 77 and inner race 63. The mechanical energy of the shaft 77, as it turns the inner race 63 in rotational direction r, should provide sufficient torque and angular momentum as to force the ERF lubricant 80 within the two regions; at the same time, the turning of inner race 63 should not be impeded due to excessive viscosity of the ERF lubricant 80. The overall electric field (or, otherwise expressed, both component electrical fields, each corresponding to one of the two regions $R_{INNER}$ and $R_{OUTER}$) should be sufficient but not excessive in order to force the ERF lubricant 80 to stay within the two regions $R_{INNER}$ and $R_{OUTER}$, thereby holding the ERF lubricant 80 within the areas of the bearing that need lubrication.

EXAMPLE 3

First-mode inventive practice (such as exemplified by Example 1) and second-mode inventive practice (such as exemplified by Example 2) involve the so-called "Winslow effect." According to inventive practice in which the "Winslow" effect is manifest, an electric field that is generated between two electrodes upon the electrification thereof results in the holding therebetween (i.e., between the respective electrode surfaces facing each other) of ERF fluid 80. As distinguished from Examples 1 and 2, the so-called "edge effects" are exhibited in Example 3 (which exemplifies third-mode inventive practice) and Example 4 (which exemplifies fourth-mode inventive practice).

Reference is now made to FIG. 7, FIG. 8, FIG. 9 and FIG. 10, which are illustrative of third-mode inventive practice. As shown in FIG. 7, each embedded electrode 200 is embedded in outer race 62 and has an electrode tip (longitudinally extreme edge) 201 that is even (flush) with the inward facing raceway surface 620 of the outer race 62. Upon the electrification of two adjacent embeddded electrodes 200, generated are electric field lines of flux that extend beyond the tips 201 of the two adjacent electrodes 200. As shown in FIG. 8, this generation of lines of electric flux results in the holding of ERF fluid 80 within the parameters of influence of the lines of electric flux.

Rolling element bearing apparatus 503, depicted in FIG. 9, includes an inner race 63 (having an outward facing raceway surface 630), an electrically nonconductive outer race 62 (having an inward facing raceway surface 620), plural electrically nonconductive balls 64 (situated between inner race 63 and outer race 62), a housing (such as housing 513 shown in FIG. 3 and FIG. 4) that defines a fluid-tight chamber 75, ERF fluid 80, and plural embedded electrodes 200. Balls 64 effect rolling contact with inward facing raceway surface 620 and outward facing raceway surface 630, and revolve in a circular path around the longitudinal axis a of rotating shaft 77 when inner race 63 and outer race 62 are characterized by relative rotational motion, e.g., when either one of inner race 63 or outer race 62 is stationary and the other one of inner race 63 and outer race 62 is rotating. Electrodes 200 are embedded in outer race 62. Wires 65 and 66 connect power supply 76 to embedded electrodes 200. Prior to operation of inventive apparatus 503, chamber 75 is filled to a suitable percentage of its capacity with ERF lubricant 80, for instance so as to form a bath such as ERF lubricant bath 800 shown in FIG. 5.

Figure 10:
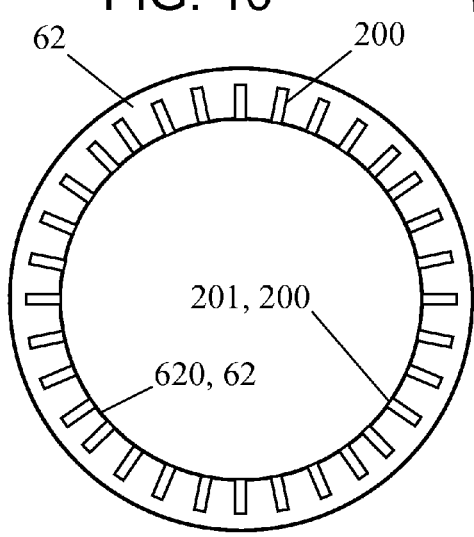
FIG. 10 is a diagrammatic and elevation view of an embodiment of an inventive combination including an outer race and electrodes embedded in the outer race, in accordance with the "third mode" of inventive practice.

Inner race 63 may be made of any suitable metal, metal alloy or nonmetallic material. Balls 64 are made of any suitable electrically nonconductive material, such as a suitable ceramic material. Outer race 62 is also made of any suitable electrically nonconductive material, such as a suitable ceramic material. The guidelines for selecting the electrically nonconductive materials of outer race 62 and balls 64 are similar to those discussed hereinabove with regard to Example 1. Embedded electrodes 200, embedded in electrically nonconductive (e.g., ceramic) outer race 62, are closely spaced apart from each other so as to be positioned at least approximately radial with respect to longitudinal axis a. According to frequent inventive practice, multiple or numerous embedded electrodes 200 are closely spaced apart from each other so that adjacent embedded electrodes 200 are nearly parallel to each other, for instance as depicted in FIG. 10. The more closely spaced are the electrodes 200, the more closely their radial orientation with respect to longitudinal axis a approximates side-by-side parallel orientation with respect to each other. Each embedded electrode 200 has an electrode tip 201 and extends to inward facing raceway surface 620 so that electrode tip 201 is flush with inward facing raceway surface 620 and is exposed to chamber 75.

Each revolving ball 64 contacts some ERF lubricant 80 and carries a quantity thereof. At least one adjacent pair of electrodes is electrified using power supply 76, which is connected to at least one adjacent pair of electrodes 20 via a wire 65 (positive charge) and a wire 66 (negative charge). Upon the electrification of an adjacent pair of embedded electrodes 200, an electric flux is established between the two embedded electrodes 200 so as to retain some ERF lubrication 80 upon the inward facing raceway surface 620 and between the two embedded electrodes 200. A lubricative electrorheological fluid 80 coating remains on the inward facing raceway surface 620 between each adjacent pair of electrodes 200.

According to many inventive embodiments, electrodes 200 are positioned around the entire circumference or substantially the entire circumference of outer race 62, akin to the spokes of a wheel, for instance as depicted in FIG. 10; upon electrification of every adjacent pair of electrodes 200, an electric flux is established between every adjacent pair of electrodes 200 so as to retain some said electrorheological fluid between every adjacent pair of electrodes 200, a lubricative electrorheological fluid 80 coating thereby remaining on the entire circumference or substantially the entire circumference of inward facing raceway 620. Power adjustment circuitry 79 can be used for adjusting, selectively among various adjacent pairs of electrodes 200, the degree of electrification of each adjacent pair of electrodes 200. Each adjacent pair of electrodes 200 can be individually adjusted in terms of viscosity and hence lubricative quality of electrorheological fluid lubricant 80 retained therebetween. An active control system 790, including at least one controller 791 (e.g., programmable logic controller) and at least one sensor 792 (e.g., thermometer, accelerometer), can be inventively implemented in association with power adjustment circuitry 79 to take sensory input as to one or more parameters (e.g., ambient heat, machinery heat, rotational speed), and to actively adjust electrification based on the sensory input. In the manner of a continuous feedback loop, the amount of electrical power (and hence the viscosity of the corresponding ERF lubricant 80) that goes to each or every (e.g., one adjacent pair, some adjacent pairs, or every adjacent pair) of electrodes 200 is adjusted by active control system 790, working in conjunction with power adjustment circuitry 79. The power adjustment can be performed collectively as to all electrodes 200, in grouped fashion as to two or more groups of two or more adjacent pairs of electrodes 200, or individually as to each adjacent pair of electrodes 200.

EXAMPLE 4

Figure 11:
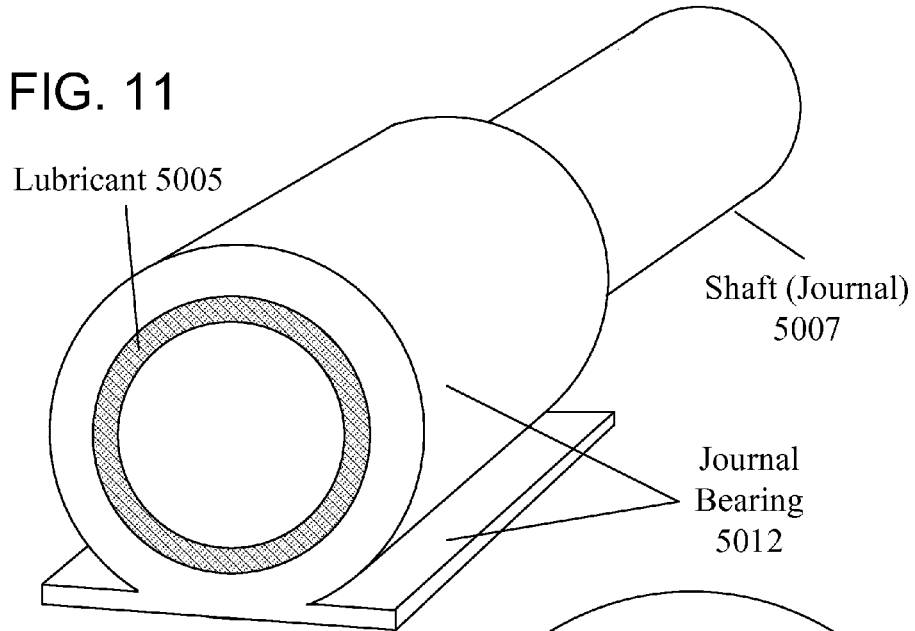
FIG. 11 is a perspective view of a conventional journal bearing arrangement, wherein the journal bearing is shown provided with lubrication and associated with a shaft.
Figure 12:
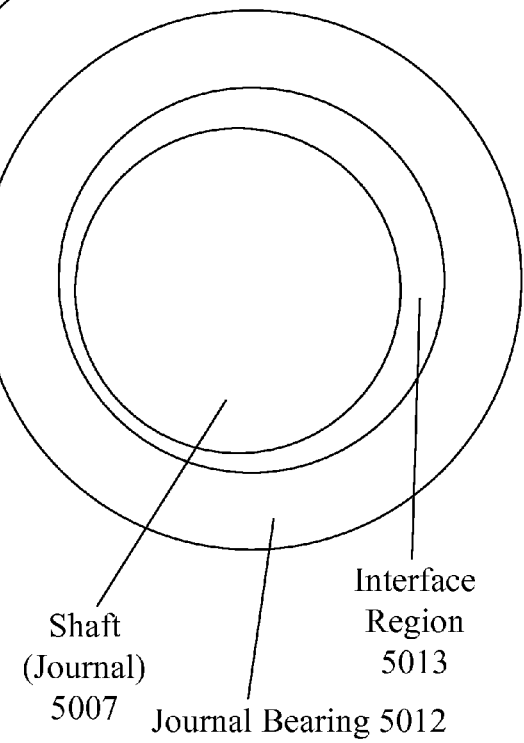
FIG. 12 is an elevation view of a conventional journal bearing arrangement such as shown in FIG. 11, illustrating tendency over time toward non-concentricity of the shaft and journal bearing with respect to each other.

With reference to FIG. 11 and FIG. 12, many conventional journal bearings 5012 are known to utilize a conventional lubricant 5005 between the shaft 5007 and the journal bearing. During relatively new operation of a conventional journal bearing, the journal bearing and the shaft are concentric (coaxial). The interface region (i.e., the region between the inward facing surface of the journal bearing and the outward facing surface of the shaft) 5013 is characterized by uniform thickness. Over time, the rotation of the shaft causes the shaft to become non-concentric with the journal bearing, such as depicted in FIG. 12, the interface region thus being characterized by non-uniform thickness. As shown in FIG. 12 by way of illustration, the interface region is significantly thinner in the vicinity of the "8 o'clock" position. When an area of the interface region becomes too thin, "boundary layer" lubrication or "mixed" lubrication results. In practice, this thinner area of the interface region is the area where the shaft and the journal bearing begin to wear.

Figure 13:
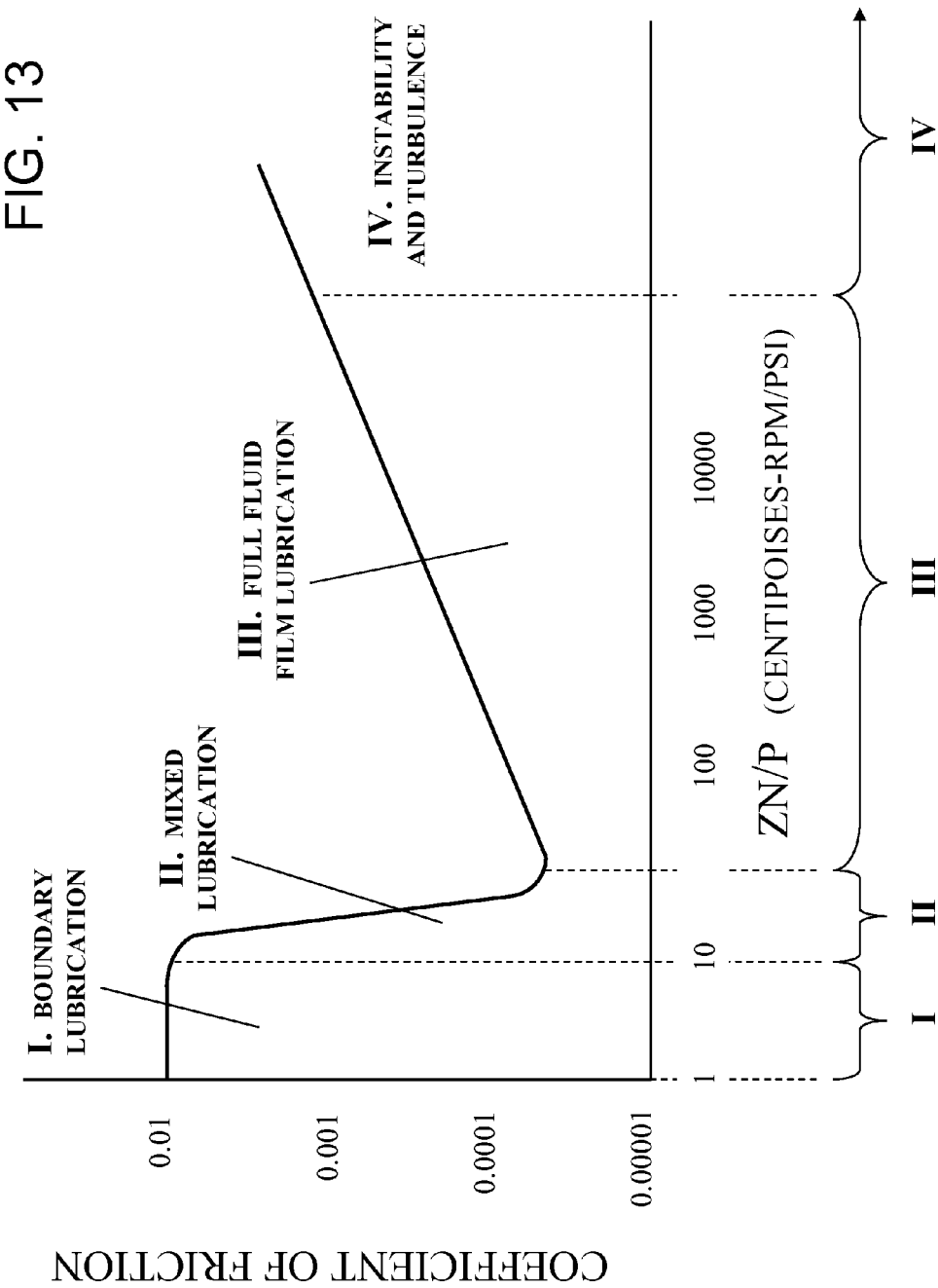
FIG. 13 is a graph illustrating theory, as pertains to utilization of a journal bearing, of the relationships of the viscosity of the lubricant and the rate of rotation of the shaft to the friction between the journal bearing and the shaft. In particular.

With reference to FIG. 13, this tendency toward non-concentricity of the conventional journal bearing and the shaft is associated with the viscosity of the lubricant. The afore-cited *Marks' Standard Handbook for Mechanical Engineers* (esp., on pages 8-114 to 8-120) and Spotts' *Design of Machine Elements* (esp., on pages 352-380) provide informative discussion of lubrication and fluid-film bearings. As demonstrated by the curve shown in FIG. 13, the viscosity of the conventional lubricant plays an important role in the interaction between the shaft and the journal bearing. The abscissa is taken as the dimensionless product G in the following equation:

$$G = \frac{ZN}{P}$$

where Z is the viscosity of the lubricant, n is the shaft rotation rate in revolutions per minute, and P is the load in pounds per square inch of the projected journal area. The "Z N/P" curve of FIG. 13 is similarly illustrated in FIG. 8.4.5 of *Marks' Standard Handbook for Mechanical Engineers* and in FIG. 8-16 of Spotts' *Design of Machine Elements*. Spotts at pages 390-391 suggests that boundary lubrication can occur in a journal bearing when the viscosity value is low, that "true" boundary lubrication is difficult to achieve (in the sense that what usually occurs is lubricant present at some locations, and rubbing at other locations), and that mixed lubrication can be a manifestation of insufficient lubrication.

Generally speaking, FIG. 13 exhibits four zones of lubricative efficiency, viz., Zone I, Zone II, Zone III, and Zone IV. Zone I represents a situation in which the product of the rotation rate of the shaft and the viscosity of the lubricant is low (e.g., when both the rotation rate and the lubricant viscosity are low). In Zone I, there is insufficient lubrication to provide for full lubrication; instead, boundary lubrication occurs. Zone II represents a situation in which the product of the rotation rate of the shaft and the viscosity of the lubricant is still low, albeit a little higher than conditions for boundary lubrication (e.g., when both the lubricant viscosity and the shaft rotation rate are a little higher than conditions for boundary lubrication). In Zone II, full lubrication is still not fully achieved; instead, mixed lubrication occurs. Zone IV represents a situation in which the product of the rotation rate of the shaft and the viscosity of the lubricant is too high (e.g., when both the lubricant viscosity and shaft rotation rate are too high). In Zone IV, instability and turbulence occur. Zone III represents the best situation; only in Zone III, when the product of the viscosity of the lubricant and the rotation rate of the shaft is sufficient but not excessive (e.g., when both the lubricant viscosity and shaft rotation rate are sufficient but not excessive), will full lubrication be achieved.

Accordingly, as depicted by FIG. 12, the rotating shaft eventually becomes non-concentric with the journal bearing. The lubricant layer in the thinner interface region (shown in FIG. 12 to be in the vicinity of 8 o'clock) typically becomes thinner. When the lubricant layer becomes too thin, boundary layer lubrication or mixed lubrication can ensue. In practical terms, this excessively thin area of lubrication is where the wear and tear occurs. Merely for illustrative purposes, FIG. 12 shows the journal bearing and the shaft to be closer to each other in the vicinity of the 8 o'clock position; it is to be understood that the skew proximity can occur at any "time-position" (e.g., 12 o'clock, 1 o'clock, etc.) around the generally circular interface region. The main point here is that shaft and journal bearing eventually become non-concentric to a degree that boundary lubrication and/or mixed lubrication occur(s) in the area(s) of the interface region where the interface region is thin (i.e., where the separation distances between the outside shaft surface and the inside journal bearing surface are small).

Figure 14:
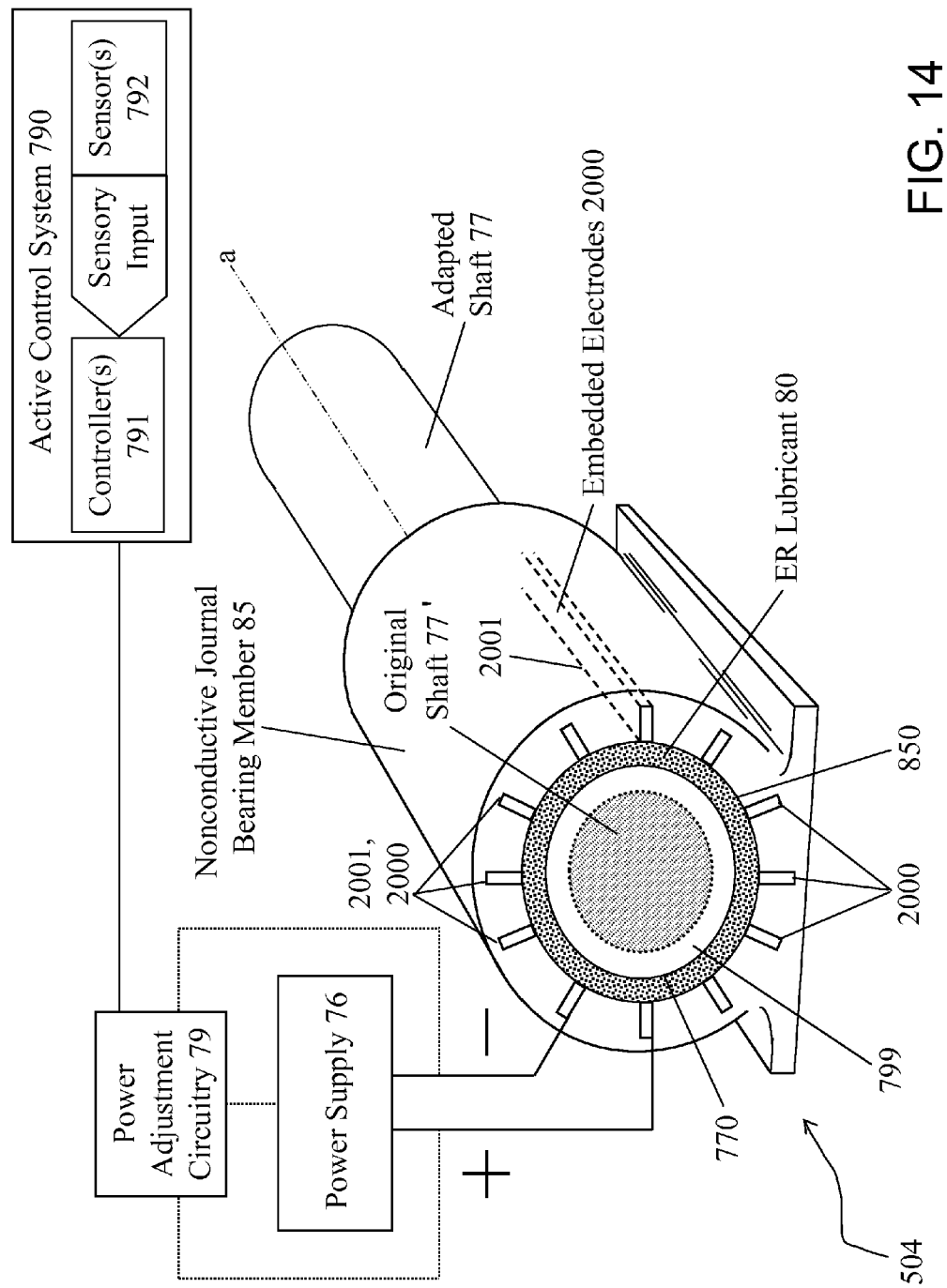
FIG. 14 is a diagrammatic and perspective view of an embodiment of the present invention's journal bearing apparatus in accordance with the "fourth mode" of inventive practice, wherein the journal bearing member has parallel axial-longitudinal electrodes embedded therein, and wherein the inward facing surface of the journal bearing member is provided with an ER fluid coating by means of electrorheological edge effects.

Reference is now made to FIG. 14, which illustrates an embodiment of fourth-mode inventive practice. Embedded electrodes 2000 in this example (Example 4) are analogous to embedded electrodes 200 in Example 3 insofar as both kinds of electrodes are embedded in a cylindrical structure that surrounds a shaft. Moreover, both the embedded electrodes 2000 of Example 4 and the embedded electrodes 200 of Example 3 manifest electrorheological edge effects, as distinguished from electrorheological Winslow effect. The "edges" of Example 4's embedded electrodes 2000 are the longitudinal side face-edges 2001; in contrast, the "edges" of Example 3's embedded electrodes 200 are the longitudinal end-face edges ("tips") 201. Thus, the embedded electrodes 200 versus 2000 are similar to each other in terms of their basic operative principle of electrical and electrorheological physics, viz., edge effects, but differ from each other in terms of their orientations and "edge effect" geometries. That is, embedded electrodes 200 are radial and perpendicular with respect to the shaft's longitudinal axis a and manifest edge effects at their end edges 201, whereas embedded electrodes 2000 are longitudinal and parallel with respect to the shaft's longitudinal axis a and manifest edge effects at their side edges 2001.

Inventive journal bearing apparatus 504 is for use in association with a shaft 77 characterized by a longitudinal shaft axis a. Journal bearing apparatus 504 includes journal bearing member 85, electrorheological fluid 80, and plural electrodes 2000. Journal bearing member 85 is cylindrical, electrically nonconductive, and characterized by a bearing length. Journal bearing member 85 has an inward facing bearing surface 850 that is characterized by an inner circumference. Shaft 77 has an outward facing shaft surface 770 characterized by an outer circumference, which is smaller than the bearing surface 850's inner circumference. Electrodes 2000 are embedded in journal bearing member 85 and are separated from each other so as to be positioned parallel to longitudinal shaft axis a and to each other. According to many embodiments of fourth-mode inventive practice, embedded electrodes 2000 run the length, or substantially the length, of journal bearing member 85.

According to typical fourth-mode inventive practice, shaft 77 is required to be electrically nonconductive, at least insofar as its relationship with the ERF fluid 80 and the electrodes 2000 is concerned. Since most shafts in their original form are made entirely of an electrically conductive (e.g., steel or other metallic) material, it often becomes necessary, in practicing the inventive fourth mode, to couple with the original shaft 77' a circumferential outside layer of electrically nonconductive material, such as electrically nonconductive outside layer 799 shown in FIG. 14. The original shaft 77' thus becomes inventively suitable shaft 77, which includes original shaft 77' and electrically nonconductive outside layer 799. Electrically nonconductive outside layer 799 thus includes the newly provided outward facing shaft surface 770; the outward facing surface of original shaft 77' is now covered by the electrically nonconductive outside layer 799. For instance, electrically nonconductive outside layer 799 can be provided by sliding an electrically nonconductive (e.g., ceramic) sleeve over the original shaft 77'. Alternatively, the original shaft 77' outside surface can be prepped (e.g., by roughening, grooving, or gnarling), and then a fiberglass or other suitable electrically nonconductive fibrous material can be circumferentially filament-wound around the original shaft 77' with an epoxy or other suitable electrically nonconductive matrix material.

When journal bearing member 85 is circumscriptively placed with respect to shaft 77, a space (interface region 99) exists between inward facing bearing surface 850 and outward facing shaft surface 770. Electrorheological fluid lubricant 80 is situated in the interface region 99. Each embedded electrode 2000 has an electrode edge 2001 and extends at least substantially the bearing length so that the electrode edge 2001 is flush with the inward facing bearing surface 850 and is exposed to the interface region 99. Upon electrification of at least one adjacent pair of embedded electrodes 2000, an electric flux is established between the two adjacent embedded electrodes 2000 so as to retain some ERF lubricant 80 upon the inward facing bearing surface 850 and between the two adjacent embedded electrodes 2000. A lubricative ERF 80 coating remains on inward facing bearing surface 850 between the two adjacent embedded electrodes 2000.

A power supply 76 is used for electrifying at least one adjacent pair of embedded electrodes 2000. According to typical inventive fourth-mode embodiments, power adjustment circuitry 79 is used for adjusting the degree of electrification of at least one adjacent pair of embedded electrodes 2000 so as to adjust the viscosity and hence the lubricative quality of ERF lubricant 80 that is retained between the two adjacent embedded electrodes 2000. Inventive journal bearing apparatus 504 is typically embodied so that embedded electrodes 2000 are positioned around the entire or substantially the entire circumference of inward facing bearing surface 850. According to such embodiments, wherein the electrode 2000 embedment is completely or nearly completely circumferential, every adjacent pair of embedded electrodes 2000 can be electrified so that some ERF lubricant 80 is retained around the entire or substantially the entire circumference of inward facing bearing surface 850, a lubricative ERF 80 coating thereby remaining on the entire or substantially the entire circumference of inward facing bearing surface 850.

In accordance with frequent practice of the inventive fourth mode, electrodes 2000 are positioned around the entire circumference or substantially the entire circumference of journal bearing member 85. Upon electrification of every adjacent pair of electrodes 2000, an electric flux is established between every adjacent pair of electrodes 2000 so as to retain some said electrorheological fluid between every adjacent pair of electrodes 2000; a lubricative electrorheological fluid 80 coating thereby remains on the entire circumference or substantially the entire circumference of inward facing bearing surface 850. Power adjustment circuitry 79 can be used for adjusting, selectively among various adjacent pairs of electrodes 2000, the degree of electrification of each adjacent pair of electrodes 2000. Each adjacent pair of electrodes 2000 can be individually adjusted in terms of viscosity and hence lubricative quality of electrorheological fluid lubricant 80 retained therebetween. An active control system 790, including at least one controller 791 (e.g., programmable logic controller) and at least one sensor 792 (e.g., thermometer, accelerometer), can be inventively implemented in association with power adjustment circuitry 79 to take sensory input as to one or more parameters (e.g., ambient heat, machinery heat, rotational speed) and to actively adjust, on a continuous feedback basis, the amount of electrical power (and hence the viscosity of the corresponding ERF lubricant 80) that goes to each or every adjacent pair of electrodes 2000. The power adjustment can be performed collectively as to all electrodes 2000, in grouped fashion as to two or more groups of two or more adjacent pairs of electrodes 2000, or individually as to each adjacent pair of electrodes 2000.

According to usual inventive principle, control of the electric field emanating between adjacent embedded electrodes 2000 is concomitant with control of the viscosity of the ERF lubricant 80 situated between the adjacent embedded electrodes 2000. The present invention is uniquely capable of controlling the viscosity of the ERF lubricant 80 in order to promote better performance. Inventive electrical control of viscosity can achieve full lubrication modality under conditions in which it would not otherwise be achieved. For instance, if the rotation rate n of shaft 77 has been deliberately decreased for an operational reason, such decrease in rotation rate n can be compensated for by electrically increasing the viscosity Z of the ERF lubricant 80. Full lubrication modality (rather than boundary modality or mixed lubrication modality) is thus achieved by increasing the Z component in the afore-noted equation G=Z N/P.

The viscosity of all of the ERF lubricant 80 can be controlled; alternatively, the viscosity or viscosities of one or more portions of the ERF lubricant 80 can be controlled. The inventive practitioner can select areas of ERF lubricant 80 that are to have higher or lower viscosities. Such viscosities can be caused to vary among plural (e.g., several or many) areas of the ERF lubricant 80. Selective electrification among plural adjacent pairs of embedded electrodes 2000 is featured by many embodiments of inventive journal bearing apparatus 504, whereby power adjustment circuitry 79 is capable of individually adjusting the degree of electrification for at least one or every adjacent pair of embedded electrodes 2000. The present invention's electrification of one or more specific areas of ERF lubricant 80 can controllably alter the viscosity of the ERF lubricant 80 within such area(s). Such selectivity may be especially propitious for inventive embodiments in which the electrode 2000 embedment is completely or nearly completely circumferential.

Similarly as illustrated in FIG. 12 for a conventional journal bearing, an inventive journal bearing apparatus 504 may have a propensity toward non-concentricity of journal bearing member 85 and shaft 77. Inward facing bearing surface 850 may initially be concentric with outward facing shaft surface 770, but then tend, over durations of operation, to be non-concentric with outward facing shaft surface 770. Power adjustment circuitry 79, inventively utilized for instance in association with an active control system 790 that includes at least one controller 791 (e.g., programmable logic controller) and at least one sensor 792 (e.g., thermometer or accelerometer), is capable of selectively adjusting the viscosity of ERF 80 at one or more different locations in interface region 99 so as to restore concentricity of inward facing bearing surface 850 with outward facing shaft surface 770. Accordingly, under certain operating conditions, the inventive practitioner can succeed in forcing shaft 77 back to a concentric geometric position with respect to bearing member 85, thereby encouraging full lubrication modality (and discouraging mixed lubrication and boundary lubrication modalities) of inventive journal bearing apparatus 504.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. Journal bearing apparatus for use in association with a shaft characterized by a longitudinal shaft axis, the journal bearing apparatus comprising:
   a cylindrical electrically nonconductive bearing member for circumscriptive placement with respect to said shaft, said bearing member being characterized by a bearing length and having an inward facing bearing surface characterized by a first circumference, said shaft having an outward facing shaft surface characterized by a second circumference that is smaller than said first circumference;
   plural electrodes embedded in said bearing member and parallel to and separated from each other, each said electrode having an electrode edge and extending at least substantially along said bearing length so that said electrode edge is flush with said inward facing bearing surface, wherein when said bearing member is circumscriptively placed with respect to said shaft, a space exists between said inward facing bearing surface and said outward facing shaft surface, each said electrode is parallel to said longitudinal shaft axis, and each said electrode edge is exposed to said space; and
   electrorheological fluid for disposition in said space, wherein upon electrification of at least one adjacent pair of said electrodes, an electric flux is established between said adjacent pair of said electrodes so as to retain some said electrorheological fluid upon said inward facing bearing surface and between said adjacent pair of said electrodes.

2. The journal bearing apparatus of claim 1 wherein a lubricative electrorheological fluid coating thereby remains on said inward facing bearing surface between said adjacent pair of said electrodes.

3. The journal bearing apparatus of claim 1 wherein said electrodes are positioned around at least substantially the entire said first circumference, and wherein upon said electrification of every said adjacent pair of said electrodes some said electrorheological fluid is retained around at least substantially the entire said first circumference of said inward facing bearing surface.

4. The journal bearing apparatus of claim 3 wherein a lubricative electrorheological fluid coating thereby remains on at least substantially the entire said first circumference of said inward facing bearing surface.

5. The journal bearing apparatus of claim 1 further comprising:
   a power supply for electrifying at least one said adjacent pair of said electrodes; and
   power adjustment circuitry for adjusting the degree of said electrification of at least one said adjacent pair of said electrodes so as to adjust the viscosity and hence the lubricative quality of some said electrorheological fluid retained between said adjacent pair of said electrodes.

6. The journal bearing apparatus of claim 5 wherein:
   a lubricative electrorheological fluid coating thereby remains on said inward facing bearing surface between said adjacent pair of said electrodes;
   said shaft is rotative about said longitudinal shaft axis;
   said inward facing bearing surface is concentric with said outward facing shaft surface during normal operation of the journal bearing apparatus but tends over time to be non-concentric with said outward facing shaft surface; and
   said power adjustment circuitry is capable of selectively adjusting the viscosity of said electrorheological fluid at different locations in said space so as to restore concentricity of said inward facing bearing surface with said outward facing shaft surface.

7. The journal bearing apparatus of claim 5, wherein:
   said electrodes are positioned around at least substantially the entire said first circumference;
   upon said electrification of every said adjacent pair of said electrodes some said electrorheological fluid is retained around at least substantially the entire said first circumference of said inward facing bearing surface; and a lubricative electrorheological fluid coating thereby remains on at least substantially the entire said first circumference of said inward facing bearing surface.

8. The journal bearing apparatus of claim 5, wherein said power adjustment circuitry:
is for adjusting the degree of said electrification of plural said adjacent pairs of said electrodes; and
is capable of individually adjusting the degree of said electrification for each said adjacent pair of said electrodes.

9. The journal bearing apparatus of claim 5 further comprising an active control system associated with said power adjustment circuitry, said active control system including at least one controller and at least one sensor, said at least one controller receiving sensory input from said at least one sensor, wherein said degree of said electrification of at least one said adjacent pair of said electrodes is actively adjusted on a continuous feedback basis in accordance with said sensory input.

10. The journal bearing apparatus of claim 9 wherein said degree of said electrification of at least two said adjacent pairs of said electrodes is actively adjusted.

11. The journal bearing apparatus of claim 9 wherein:
said degree of said electrification of every said adjacent pair of said electrodes is actively adjusted;
said electrodes are positioned around at least substantially the entire said first circumference;
upon said electrification of every said adjacent pair of said electrodes some said electrorheological fluid is retained around at least substantially the entire said first circumference of said inward facing bearing surface; and
a lubricative electrorheological fluid coating thereby remains on at least substantially the entire said first circumference of said inward facing bearing surface.

12. The journal bearing apparatus of claim 9, wherein said shaft is rotative about said longitudinal shaft axis, wherein said inward facing bearing surface is concentric with said outward facing shaft surface during normal operation of the journal bearing apparatus but tends over time to be non-concentric with said outward facing shaft surface, and wherein said power adjustment circuitry is capable of selectively adjusting the viscosity of said electrorheological fluid at different locations in said space so as to restore concentricity of said inward facing bearing surface with said outward facing shaft surface.

13. The journal bearing apparatus of claim 9, wherein said at least one sensor includes at least one of a thermometer and an accelerometer, and wherein said sensory input pertains to at least one of ambient temperature, machinery temperature, and rotational speed of said shaft.

14. Journal bearing apparatus for use in association with a shaft characterized by a longitudinal shaft axis, the journal bearing apparatus comprising:
a cylindrical electrically nonconductive bearing member for circumscriptive placement with respect to said shaft, said bearing member being characterized by a bearing length and having an inward facing bearing surface characterized by a first circumference;
a circumferential electrically nonconductive outside layer for combination with said shaft, said outside layer having an outward facing layer surface characterized by a second circumference that is smaller than said first circumference;
plural electrodes embedded in said bearing member and parallel to and separated from each other, each said electrode having an electrode edge and extending at least substantially along said bearing length so that said electrode edge is flush with said inward facing bearing surface, wherein when said bearing member is circumscriptively placed with respect to said outside layer combined with said shaft, a space exists between said inward facing bearing surface and said outward facing layer surface, each said electrode is parallel to said longitudinal shaft axis, and each said electrode edge is exposed to said space; and
electrorheological fluid for disposition in said space, wherein upon electrification of at least one adjacent pair of said electrodes, an electric flux is established between said adjacent pair of said electrodes so as to retain some said electrorheological fluid upon said inward facing bearing surface and between said adjacent pair of said electrodes.

15. The journal bearing apparatus of claim 14 further comprising:
a power supply for electrifying at least one said adjacent pair of said electrodes; and
power adjustment circuitry for adjusting the degree of said electrification of at least one said adjacent pair of said electrodes so as to adjust the viscosity and hence the lubricative quality of some said electrorheological fluid retained between said adjacent pair of said electrodes.

16. The journal bearing apparatus of claim 15 wherein:
a lubricative electrorheological fluid coating thereby remains on said inward facing bearing surface between said adjacent pair of said electrodes;
said shaft is rotative about said longitudinal shaft axis;
said inward facing bearing surface is concentric with said outward facing shaft surface during normal operation of the journal bearing apparatus but tends over time to be non-concentric with said outward facing shaft surface; and
said power adjustment circuitry is capable of selectively adjusting the viscosity of said electrorheological fluid at different locations in said space so as to restore concentricity of said inward facing bearing surface with said outward facing shaft surface.

17. The journal bearing apparatus of claim 15, wherein:
said electrodes are positioned around at least substantially the entire said first circumference;
upon said electrification of every said adjacent pair of said electrodes some said electrorheological fluid is retained around at least substantially the entire said first circumference of said inward facing bearing surface; and
a lubricative electrorheological fluid coating thereby remains on at least substantially the entire said first circumference of said inward facing bearing surface.

18. The journal bearing apparatus of claim 15, wherein said power adjustment circuitry:
is for adjusting the degree of said electrification of plural said adjacent pairs of said electrodes; and
is capable of individually adjusting the degree of said electrification for each said adjacent pair of said electrodes.

19. The journal bearing apparatus of claim 15 further comprising an active control system associated with said power adjustment circuitry, wherein:
said active control system includes at least one controller and at least one sensor;
said at least one controller receives sensory input from said at least one sensor;
said sensory input pertains to at least one of ambient temperature, machinery temperature, and rotational speed of said shaft;
said at least one sensor includes at least one of a thermometer and an accelerometer; and said degree of said electrification of at least one said adjacent pair of said electrodes is actively adjusted on a continuous feedback basis in accordance with said sensory input.

20. A method for providing lubricative support for a shaft characterized by a longitudinal shaft axis, the method comprising:

embedding plural electrodes in a cylindrical electrically nonconductive bearing member characterized by a bearing length and having an inward facing bearing surface, said electrodes being separated from and parallel to each other, each said electrode having an electrode edge and extending at least substantially along said bearing length so that said electrode edge is flush with said inward facing bearing surface;

combining a circumferential electrically nonconductive outside layer with said shaft, said outside layer having an outward facing layer surface characterized by a layer circumference that is smaller than said bearing circumference;

placing said bearing member circumscriptively with respect to said shaft so that a space exists between said inward facing bearing surface and said outward facing layer surface, and so that said electrodes are parallel to said longitudinal shaft axis;

situating electrorheological fluid in said space; and electrifying at least one adjacent pair of said electrodes so that an electric flux is established between said adjacent pair of said electrodes so as to retain some said electrorheological fluid upon said inward facing bearing surface and between said adjacent pair of said electrodes, a lubricative electrorheological fluid coating thereby remaining on said inward facing bearing surface between said adjacent pair of said electrodes.

* * * * *